_(12)_ United States Patent
Miller et al.

(10) Patent No.: US 6,944,365 B2
(45) Date of Patent: Sep. 13, 2005

(54) OFF AXIS OPTICAL SIGNAL REDIRECTION ARCHITECTURES

(75) Inventors: Samuel Lee Miller, Albuquerque, NM (US); Paul Jackson McWhorter, Albuquerque, NM (US)

(73) Assignee: MEMX, Inc., Albuquerque, NM (US)

( * ) Notice: Subject to any disclaimer, the term of this patent is extended or adjusted under 35 U.S.C. 154(b) by 344 days.

(21) Appl. No.: 10/037,816

(22) Filed: Jan. 3, 2002

(65) Prior Publication Data

US 2003/0123788 A1 Jul. 3, 2003

(51) Int. Cl.$^7$ ................................................. G02B 6/26
(52) U.S. Cl. ........................................................ 385/18
(58) Field of Search ................ 385/16–18; 359/223–224

(56) References Cited

U.S. PATENT DOCUMENTS

| | | | |
|---|---|---|---|
| 3,990,780 A | 11/1976 | Dakss | 350/96 |
| 4,208,094 A | 6/1980 | Tomlinson, III et al. | 350/96.2 |
| 4,365,863 A | 12/1982 | Broussaud | 350/96.15 |
| 4,838,631 A | 6/1989 | Chande et al. | 350/6.6 |
| 5,583,688 A | 12/1996 | Hornbeck | 359/291 |
| 5,600,383 A | 2/1997 | Hornbeck | 348/771 |

(Continued)

FOREIGN PATENT DOCUMENTS

JP         2617054         6/1997

OTHER PUBLICATIONS

Lucent Technologies, WaveStar LambdaRouter Brochure, 2000, 6 Pages.

Primary Examiner—Gregory J. Toatley, Jr.
Assistant Examiner—Kara Geisel
(74) Attorney, Agent, or Firm—Marsh Fischmann & Breyfogle LLP

(57) ABSTRACT

The present invention is directed to off axis optical signal redirection architectures that employ positionable reflective microstructures (e.g. microelectromechanical (MEM) mirrors) fabricated on one or more substrates. In one embodiment, an optical signal redirection system (10) includes a reflective microstructure array (12) formed on a substrate (30). The reflective microstructure array (12) includes one or more reflective microstructures (14). Each of the reflective microstructures (14) includes an optically reflective surface (20) and is positionable with respect to the substrate (30) in order to orient its reflective surface (20) for redirecting optical signals (24) incoming from one or more originating locations (16) to one or more target locations (18). Each orientation required for a given reflective microstructure (14) to redirect an optical signal (24) incoming from an originating location (16) to a target location (18) is defined by a unit vector (22) that is normal to the reflective surface (20) of such reflective microstructure (14). An average normal vector (26) associated with the reflective microstructure array (12) defined as the average of the set of individual unit normal vectors (22) forms a first non-zero angle θ with respect to the substrate normal (34).

54 Claims, 13 Drawing Sheets

U.S. PATENT DOCUMENTS

| | | | |
|---|---|---|---|
| 5,783,340 A | 7/1998 | Farino et al. | 430/22 |
| 5,798,283 A | 8/1998 | Montague et al. | 438/24 |
| 5,804,084 A | 9/1998 | Nasby et al. | 216/2 |
| 5,867,302 A | 2/1999 | Fleming | 359/291 |
| 5,875,271 A | 2/1999 | Laughlin | 385/16 |
| 5,959,375 A | 9/1999 | Garcia | 310/40 |
| 5,960,132 A | 9/1999 | Lin | 385/18 |
| 5,986,381 A | 11/1999 | Hoen et al. | 310/309 |
| 6,082,208 A | 7/2000 | Rodgers et al. | 74/406 |
| 6,097,859 A | 8/2000 | Solgaard et al. | 385/17 |
| 6,133,670 A | 10/2000 | Rodgers et al. | 310/309 |
| 6,175,170 B1 | 1/2001 | Kota et al. | 310/40 |
| 6,201,629 B1 | 3/2001 | McClelland et al. | 359/223 |
| 6,211,599 B1 | 4/2001 | Barnes | 310/309 |
| 6,253,001 B1 | 6/2001 | Hoen | 385/17 |
| 6,289,145 B1 | 9/2001 | Solgaard et al. | 385/17 |
| 6,310,339 B1 | 10/2001 | Hsu et al. | 250/214.1 |
| 6,327,398 B1 | 12/2001 | Solgaard et al. | 385/18 |
| 6,466,711 B1 | 10/2002 | Laor et al. | 385/18 |
| 6,483,962 B1 | 11/2002 | Novotny | 385/18 |
| 6,501,869 B1 * | 12/2002 | Athale | 385/18 |
| 6,640,023 B2 * | 10/2003 | Miller et al. | 385/17 |
| 6,728,017 B2 * | 4/2004 | Park | 359/224 |
| 2001/0048265 A1 | 12/2001 | Miller et al. | 310/309 |
| 2001/0051015 A1 | 12/2001 | Gutierrez et al. | 385/17 |
| 2002/0044718 A1 | 4/2002 | Nishi et al. | 385/17 |
| 2002/0076138 A1 | 6/2002 | Tew | 385/18 |
| 2002/0122619 A1 | 9/2002 | Sandler et al. | 385/17 |
| 2002/0146197 A1 * | 10/2002 | Yong | 385/18 |
| 2002/0164113 A1 | 11/2002 | Rensing et al. | 385/18 |
| 2003/0012488 A1 * | 1/2003 | Staple et al. | 385/18 |

* cited by examiner

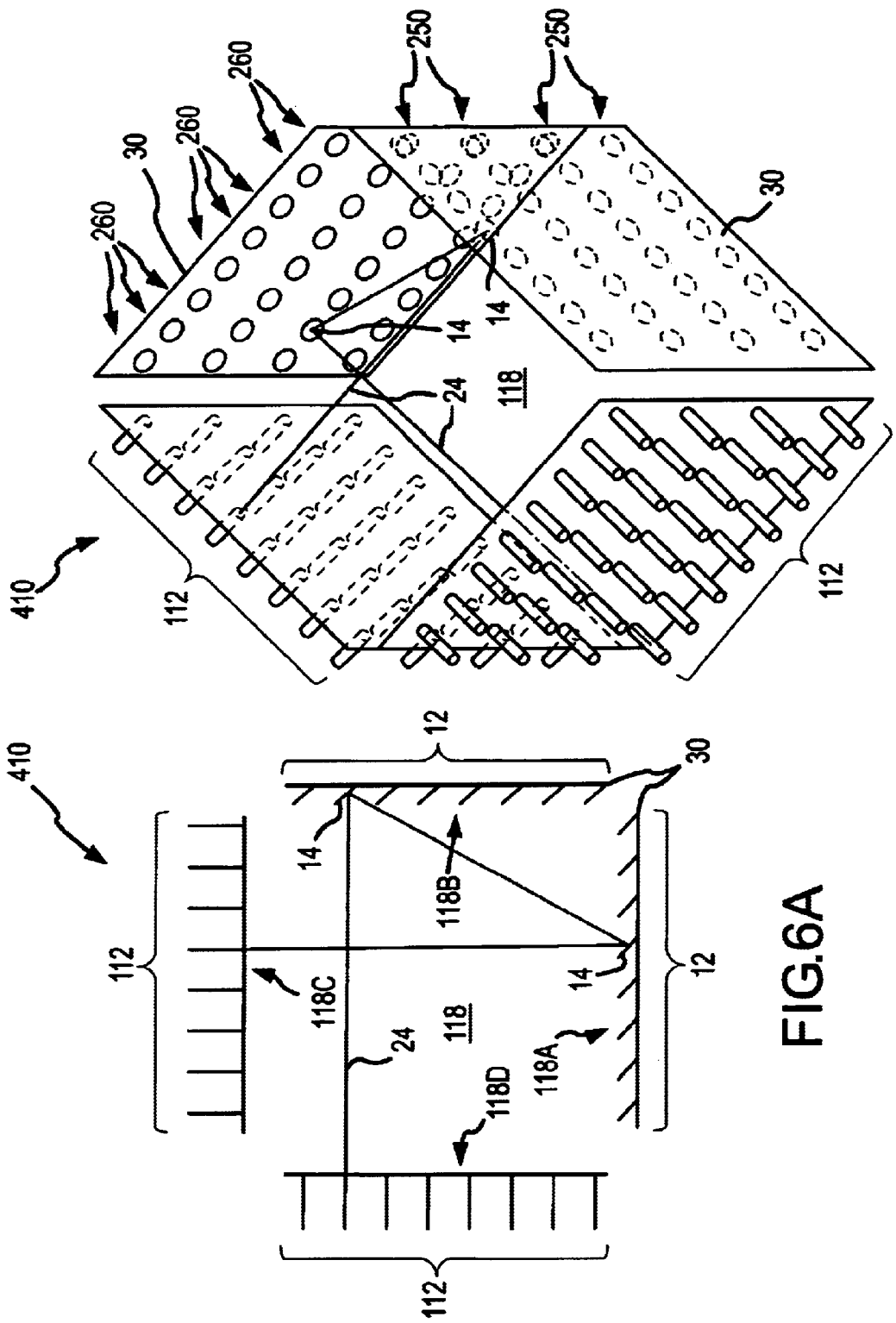

OFF AXIS OPTICAL SIGNAL REDIRECTION ARCHITECTURES

FIELD OF THE INVENTION

The present invention relates generally to the field of optical telecommunications equipment, and more particularly to reflective-type optical signal redirection equipment employing one or more arrays of positionable reflectors.

BACKGROUND OF THE INVENTION

With the increasing use of optical signals in telecommunications networks, the demand for high-bandwidth capable equipment for redirecting the transmission of optical signals within the network, such as N×N optical switches (where N is a positive whole number), multiplexers (i.e. an N×1 switch), demulitplexers (i.e., a 1×N switch) and the like, has increased. One type of optical switch converts an optical signal received on one optical port to the switch interface (e.g., an optical fiber end) to an electrical signal, redirects the signal electronically, and re-converts the electrical signal to an optical signal output on a desired optical port from the switch interface (e.g., another optical fiber end). Such optical switches are known as Optical Electrical Optical (OEO) switches. As may be appreciated, the bandwidth and switching speed capabilities of an OEO switch may be limited by the initial optical-to-electrical and subsequent electrical-to-optical signal conversions that are required.

A different approach to redirecting optical signals within the network is known that overcomes the limitations of OEOs by redirecting the signals in the optical domain eliminating the optical-to-electrical and electrical-to-optical signal conversions. Such all optical switches are known in the art as Optical Cross Connect (OXC) switches. One type of OXC utilizes moveable reflectors (e.g., mirrors) to provide for the redirection of optical signals within the free space of the switch interface (i.e. without optical fibers, waveguides or the like guiding transmission of the optical signals within the switch interface). Typically such switches employ at least a pair of reflectors that are moved to respective orientations in order to provide an optical pathway within the free-space of the switch interface between any one of a plurality of input ports to the switch interface and any one of a plurality of output ports from the switch interface.

As may be appreciated, an important parameter of reflective-type free space OXCs is how quickly the reflectors can be accurately positioned in the orientations required to direct an optical signal between the desired input and output optical ports. This in turn may depend upon a number of factors, including how far the reflectors must be moved from respective predetermined reference orientations to the required orientations. Other important parameters of reflective-type free space OXCs include the length of the optical pathway within the free space switch interface that an optical signal must traverse in order pass from one of the input ports to one of the output ports and the proximity of the optical inputs and outputs to the reflectors. As the distance between the reflectors and the inputs and outputs increases, there is less tolerance to alignment inaccuracies between the reflectors and the inputs and outputs.

SUMMARY OF THE INVENTION

Accordingly, the present invention is directed to optical signal redirection architectures that employ positionable reflective microstructures (e.g. microelectromechanical (MEM) mirrors) fabricated on one or more substrates. The term "substrate" as used herein means those types of structures that can be handled by the types of equipment and processes that are used to fabricate micro-devices on, within, and/or from the substrate using one or more micro photolithographic patterns.

In accordance with the present invention, a system for redirecting optical signals includes a substrate and a reflective microstructure array formed on the substrate. In this regard, at least a portion of the reflective microstructure array may be formed on the substrate using sacrificial surface micromachining, bulk micromachining, or lithography galvanoforming abforming (LIGA) processes. In some embodiments of the system, there may be additional reflective microstructure arrays formed on the same or additional substrates. The reflective microstructure array includes at least one reflective microstructure. In embodiments where there are more than one reflective microstructure within the reflective microstructure array, the reflective microstructures may be arranged on the substrate in a rectangular pattern of rows and columns. Other patterned arrangements such as, for example, arcuate arrangements are also possible.

Each reflective microstructure of the reflective microstructure array includes an optically reflective surface (e.g., an optically reflective coating deposited on a surface thereof) and is positionable with respect to a first surface of the substrate to orient its reflective surface to redirect an optical signal from at least one originating location to at least one target location. The reflective microstructure(s) may be positionable to redirect optical signals from the originating location(s) directly to the target location(s) or indirectly to the target location(s) via another reflective surface. In this regard, the system may further include a fixed reflective surface that is fixed in a position relative to the reflective microstructure array to provide an optical pathway between the target location(s) and the reflective microstructure(s) of the reflective microstructure array. The originating location(s) may, for example, comprise optical ports (e.g., optical fiber ends), other positionable reflective microstructures of the same or a different reflective microstructure array, a solid state laser array, a point on an object whose image is being scanned, a prism, or an attenuation device. The target location(s) may, for example, comprise optical ports (e.g., optical fiber ends), other positionable reflective microstructures of the same or a different reflective microstructure array, optically sensitive regions on a semiconductor chip (e.g., a photo-diode array), a fluorescent screen for displaying an image, a polarizer, a diffraction grating, the back of an individual's eyeball in laser surgery, or a cell in an aqueous solution to illuminate it for analysis. It will be appreciated that, depending upon the direction of propagation of an optical signal, an originating location may comprise a target location and a target location may comprise an originating location.

The appropriate orientation required for each reflective microstructure of the reflective microstructure array to redirect an optical signal from a given originating location to a given target location is defined by a unit vector that is normal to the reflective surface of such reflective microstructure. Each reflective microstructure may have one or more unit normal vectors associated therewith, depending upon the number of originating locations and target locations for which the reflective microstructure is positionable to redirect optical signals therebetween. The unit normal vectors associated with each of the reflective microstructures together comprise a set of unit normal vectors. An average normal vector associated with the reflective microstructure array may thus be defined as the average of the set of unit normal vectors. In accordance with the present invention, the average normal vector associated with the reflective microstructure array is non-parallel with a vector normal to the first surface of the substrate (the substrate normal). In this regard, the reflective microstructure array is referred to as an off axis reflective microstructure array because the average normal vector associated with the reflective microstructure array forms a non-zero angle with the substrate normal.

In one aspect of the present invention, the average normal vector forms an acute angle with the substrate normal that is greater than five degrees. More preferably the acute angle formed is between ten degrees and eighty degrees. In another aspect of the present invention, the average normal vector associated with the reflective microstructure array forms a first angle with the substrate normal that is greater than five degrees, and more preferably greater than ten degrees. Additionally a set of second angles measured between projections of the individual unit normal vectors associated with the reflective microstructure array onto the first surface of the substrate and a reference axis defined on the first surface of the substrate span a range that is greater than two degrees. More preferably, the range spanned by the set of second angles is greater than ten degrees. In yet another aspect of the present invention, a set of angles measured between projections of the individual unit normal vectors associated with the reflective microstructure array onto the first surface of the substrate and a reference axis defined on the first surface of the substrate span a range that is greater than two degrees and less than one-hundred eighty degrees. More preferably, the range spanned by the set of angles is greater than ten degrees and less than one-hundred twenty degrees.

The reflective microstructure(s) of the reflective microstructure array may be positionable with one, two, or more degrees of freedom utilizing open loop control schemes (i.e., without feedback information from optical detectors or the like). In this regard, the reflective microstructure array may include at least one microactuator formed on the substrate for each reflective microstructure in the array, with each reflective microstructure being operatively coupled with at least one of the microactuators. The microactuators may, for example, comprise electrostatic actuators, electromagnetic actuators, thermal actuators, or magnetic actuators.

The substrate may be positioned with respect to the originating location(s) such that the substrate normal is parallel with either an optical signal beam incident on the reflective microstructure or a corresponding optical signal beam reflected from the reflective microstructure. Alternatively, the substrate on which the reflective microstructure array is formed may be positioned with respect to the originating location(s) such that the substrate normal forms a non-zero angle with both an optical signal beam incident on the reflective microstructure and a corresponding optical signal beam reflected from the reflective microstructure. In either case, the system may be configured to have an effective packing density of the reflective microstructure array that exceeds a real packing density of the reflective microstructure array.

As mentioned previously, an optical signal redirection system in accordance with the present invention may include more than one reflective microstructure array formed on one or more substrates. In this regard, numerous exemplary systems having more than one reflective microstructure array formed on one or more substrates are possible. For example, the system may include at least two reflective microstructure arrays, with the reflective microstructures of the reflective microstructure arrays being positionable to redirect optical signals between selected groups of optical ports associated therewith. The system may include a fixed reflective surface that is fixed in a position relative to at least two reflective microstructure arrays to provide an optical pathway between the reflective microstructure arrays. The system might also include at least two substrates and at least two reflective microstructure arrays, with each reflective microstructure array being formed on a separate one of the substrates and at least two of the substrates being positioned such that their respective substrate normals are parallel. The system may also be configured to include at least two substrates and at least two reflective microstructure arrays, with each reflective microstructure array being formed on a separate one of the substrates and at least two of the substrates being positioned such that their respective substrate normals are oriented at a non-zero angle with respect to each other.

Optical signal redirection systems in accordance with the present invention may be configured for a number of applications. For example, each reflective microstructure of the reflective microstructure array(s) may be positionable to selectively switch an optical signal on and off at an associated target location (i.e., the optical signal redirection system may function as an optical switch). In another example, an optical signal redirection system may be configured as an OXC. In this regard, each originating location and each target location may comprise an optical port (e.g., an optical fiber end), with the reflective microstructure(s) of the reflective microstructure array(s) being positionable in orientations required to redirect optical signals between selected pairs of optical ports. A portion of the optical ports may be arranged in at least one planar array of optical ports, and at least one of the plurality of optical ports may be positioned outside of the plane of the array of optical ports. By way of further examples, an optical signal redirection system in accordance with the present invention may comprise an optical protection switch (e.g., a 1×2 switch used to switch optical signals from a primary pathway that has suffered an equipment failure to a secondary pathway with back-up equipment), an optical signal mulitplexer, or an optical signal demulitplexer.

Optical signal redirection systems (e.g., OXCs, multiplexers, demultiplexers, optical protection switches, etc.) incorporating off axis reflective microstructure arrays in accordance with the present invention achieve a number of advantages. Greater effective packing density can be achieved by having the optical signal beams from the originating location(s) impinge on the reflective microstructure array at an angle. In fact, effective packing densities of virtually one-hundred percent can be achieved in one direction of the array. By having one of the entering or exiting beams impinge on the reflective microstructure array at an angle, originating and/or target location(s) may be placed in close proximity to the reflective microstructure array, thereby reducing the path length to/from the reflective microstructures. Reduced optical path length between system elements enables easier alignment and system assembly and also achieves reductions in optical signal losses, resulting in reduced cost and enhanced performance. Utilizing off axis reflective microstructure arrays enables greater flexibility regarding where optical ports, reflective microstructures, and other optical elements are positioned, enabling greater flexibility in overall system designs. Off axis optical signal redirection system architectures inherently enable the use of high tilt angle reflective microstructure positioning systems, further enabling shorter path lengths, easier alignment, reduced signal loss, and greater flexibility in system design. Further, the high tilt angle reflective microstructure positioning systems may be designed to only require two control signals for operation. Minimizing the number of required control signals is advantageous for several reasons: (1) it enables greater real reflective microstructure packing density for large arrays because of the reduced number of on-chip interconnects; (2) it enables simpler packaging methods because of the reduced number of off-chip interconnects; (3) it enables simpler control systems because of the reduced number of control signals; and (4) it enables the entire optical system to be inherently more reliable because of the reduced number of interconnects and components.

According to another aspect of the present invention, an optical cross connect for switching optical signals between a first plurality of optical ports (e.g., a first group of optical fiber ends) and a second plurality of optical ports (e.g., a second group of optical fiber ends) includes a first substrate having a surface facing the first plurality of optical ports and a second substrate having a surface facing the second plurality of optical ports. The first and second substrates are separate and distinct structures. A first off axis reflective microstructure array is formed on the surface of the first substrate. The first off axis reflective microstructure array includes a plurality of positionable reflective microstructures. Each reflective microstructure of the first off axis reflective microstructure array is associated with one of the first plurality of optical ports and includes an optically reflective surface. A second off axis reflective microstructure array is formed on the surface of the second substrate. The second off axis reflective microstructure array includes a plurality of positionable reflective microstructures. Each reflective microstructure of the second off axis reflective microstructure array is associated with one of the second plurality of optical ports and includes an optically reflective surface. Each reflective microstructure of the first off axis reflective microstructure array is positionable to orient its reflective surface to reflect an optical signal receivable from its associated optical port directly, or indirectly via an intermediate reflective surface, to the reflective surface of at least one of the reflective microstructures of the second off axis reflective microstructure array and likewise reflect an optical signal receivable directly, or indirectly via an intermediate reflective surface, from at least one of the reflective microstructures of the second off axis reflective microstructure array to its associated optical port. Each reflective microstructure of the second off axis reflective microstructure array is positionable to orient its reflective surface to reflect an optical signal receivable from its associated optical port directly, or indirectly via an intermediate reflective surface, to the reflective surface of at least one of the reflective microstructures of the first off axis reflective microstructure array and likewise reflect an optical signal receivable directly, or indirectly via an intermediate reflective surface, from at least one the reflective microstructures of the first off axis reflective microstructure array to its associated optical port.

The first and second pluralities of optical ports and the first and second off axis reflective microstructure arrays may be positioned with respect to one another in a number of manners. For example, the first and second pluralities of optical ports may be positioned on a first side of a free space switch interface and the first and second substrates may be positioned on a second side of the free space switch interface opposite the first side of the free space switch interface. The first and second pluralities of optical ports may be laterally spaced apart from one another on the first side of the free space switch interface and the first and second substrates may likewise be laterally spaced apart from one another on the second side of the free space switch interface. In this regard, the optical cross connect may include an intermediate reflective surface that is positioned on the first side of the free space switch interface between the first and second pluralities of optical ports. The intermediate reflective surface faces towards the second side of the switch interface and allows the reflective microstructures of the first and second off axis reflective microstructure arrays to reflect signals therebetween without being positioned to provide direct optical pathways between their reflective surfaces through the free space switch interface. Rather, the reflective microstructures of the first and second off axis reflective microstructure arrays are positioned to reflect optical signals to the intermediate reflective surface which further reflects the signals to the reflective surfaces of the reflective microstructures of the first and second off axis reflective microstructure arrays.

By way of another example, the first plurality of optical ports and the second substrate may be positioned on a first side of the free space switch interface and the second plurality of optical ports and the first substrate may be positioned on the second side of the free space switch interface. By way of a further example, the first and second pluralities of optical ports and the first and second substrates may be positioned on respective sides of a polyhedral free space switch interface. In this regard, the first and second substrates may be oriented at an orthogonal angle with respect to one another with the first plurality of optical ports being parallel with and opposite the first substrate and the second plurality of optical ports being parallel with and opposite the second substrate on respective sides of a cubical free-space switch interface.

Regardless of the relative positioning of the first and second pluralities of optical ports and the first and second substrates, the first and second pluralities of optical ports may be arranged in rows and columns with the reflective microstructures of the first and second off axis reflective microstructure arrays also being arranged in corresponding rows and columns on the first and second substrates. When the reflective microstructures are arranged in rows and columns, it will be appreciated that there must be sufficient space between adjacent rows and columns to prevent adjacent reflective microstructures from blocking transmission of reflected optical signals to their desired destinations (i.e., to another reflective microstructure either directly or via the intermediate reflective surface). In this regard, minimum row and columnar spacing requirements can be defined in terms of the pitch of the reflective microstructures along the rows and columns. The minimum pitch requirements depend upon factors such as the dimensions of the reflective microstructures measured in the directions of the rows and columns, the number of rows and columns, and the maximum angle by which the reflective microstructures may be titled with respect to the substrate(s). Further, a minimum required distance across the free space switch interface depends on factors such as the number of rows (or columns), the dimensions of the reflective microstructures measured in the direction of the rows (or columns), and the maximum angle(s) by which the reflective microstructures may be tilted with respect to the substrate(s).

According to a further aspect of the present invention, a method of redirecting optical signals from originating locations to target locations includes the step of positioning each reflective microstructure of a reflective microstructure array fabricated on a first surface of a substrate in an appropriate orientation with respect to the first surface of the substrate for receiving an optical signal from a specified originating location and reflecting the optical signal to a specified target location. In this regard, the appropriate orientation of each reflective microstructure may be defined by an associated unit normal vector that is oriented orthogonal to a reflective surface of each reflective microstructure. In the process of positioning the reflective microstructures, an average normal vector comprising substantially all of the unit normal vectors associated with the appropriate orientations of the reflective microstructures forms an acute angle with a vector normal to the first surface of the substrate that is greater than five degrees. In this regard, the acute angle is more preferably between ten degrees and eighty degrees. One or more of the specified originating locations may, for example, comprise an optical port, a reflective microstructure of the same reflective microstructure array, a reflective microstructure of another reflective microstructure array, or a fixed reflective surface. Likewise, one or more of the specified target locations may, for example, comprise an optical port, a reflective microstructure of the same reflective microstructure array, a reflective microstructure of another reflective microstructure array, or a fixed reflective surface. Once the reflective microstructures are appropriately oriented, optical signals are then received on the reflective surfaces of the reflective microstructures from the specified originating locations. The received optical signals are reflected from the reflective surfaces of the reflective microstructures to the specified target locations.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIGS. 6A–B show top and isometric views of one more embodiment of a multi-substrate 2N OXC architecture incorporating off axis reflective microstructure arrays in accordance with the present invention;

DETAILED DESCRIPTION

Figure 1A:
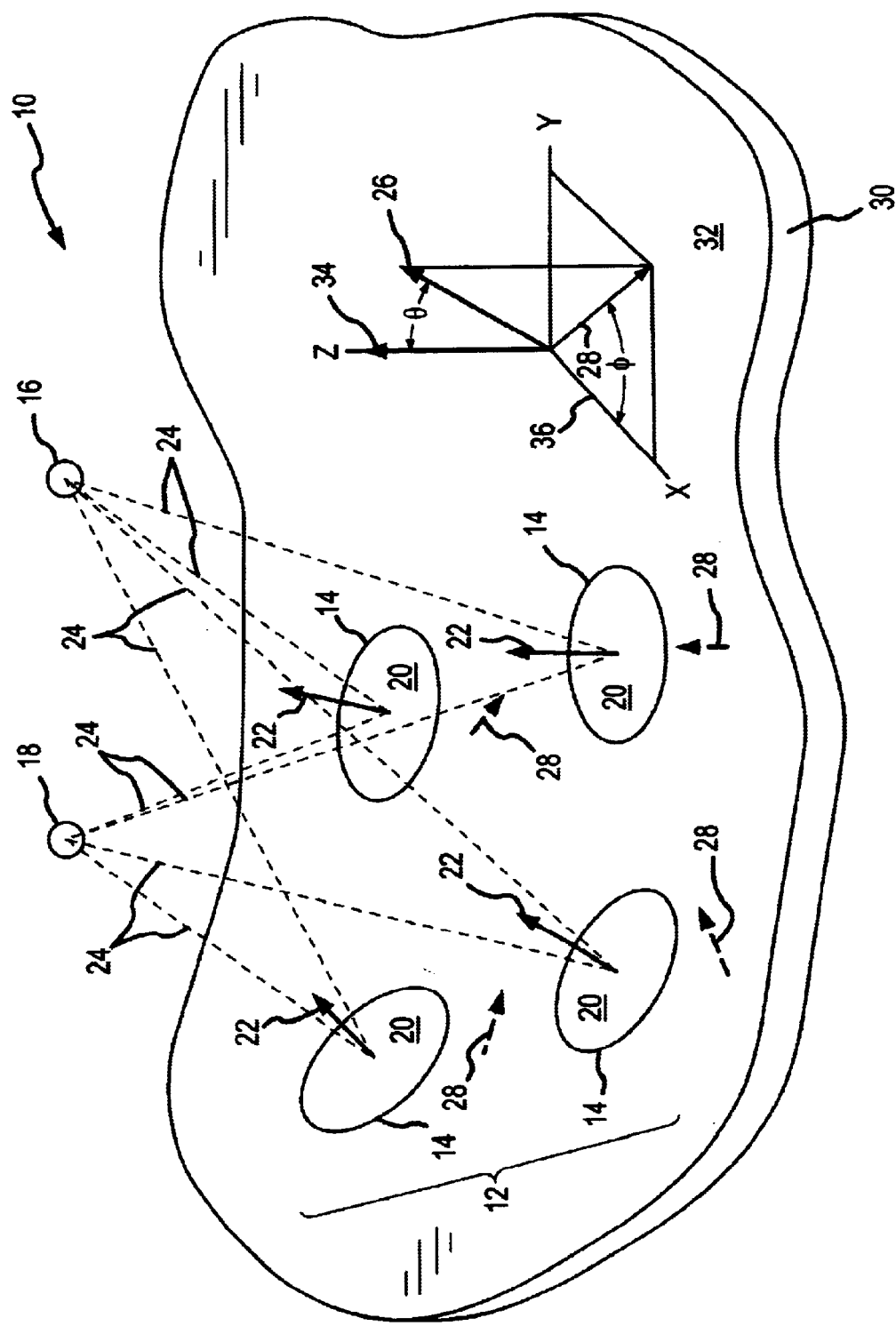
FIG. 1A shows perspective view of an optical signal redirection system incorporating an off axis reflective microstructure array in accordance with the present invention.
Figure 1B:
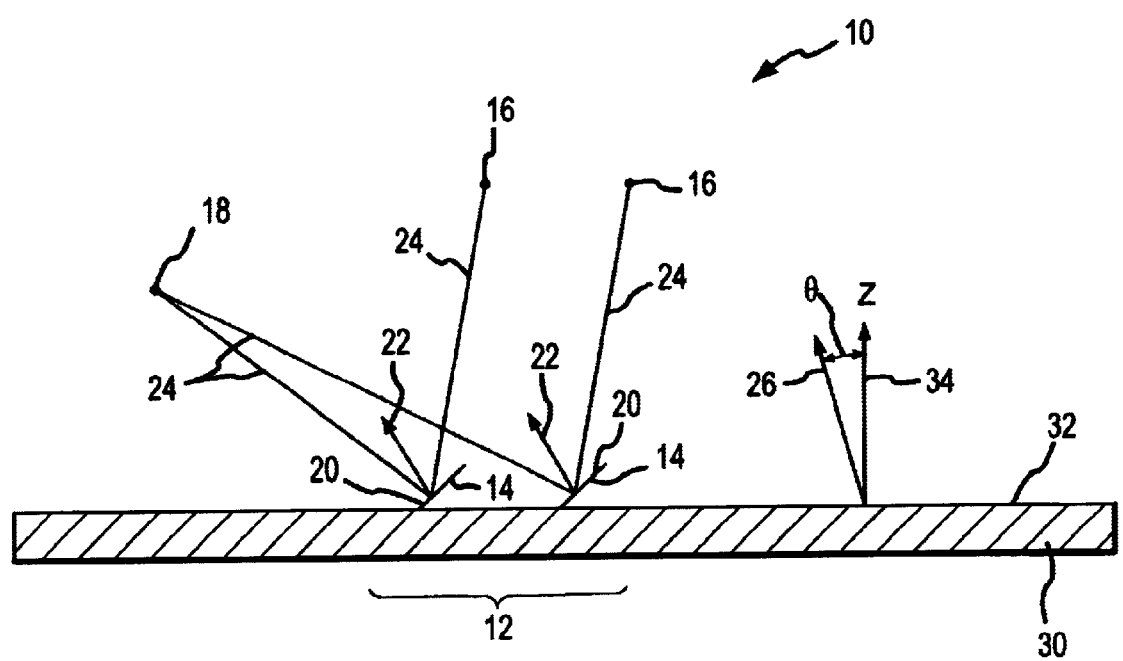
FIGS. 1B–C show end views of optical signal redirection systems incorporating off axis reflective microstructure arrays in accordance with the present invention.
Figure 1C:
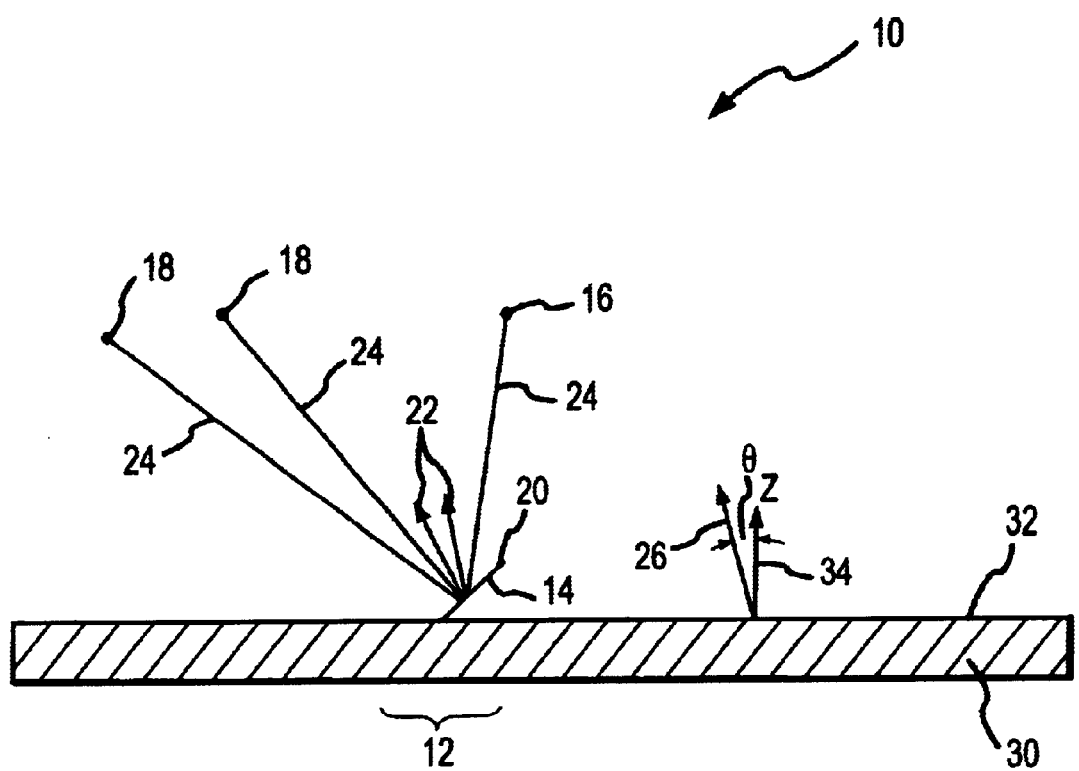

Referring now to FIGS. 1A–C, there are shown several examples of off axis optical signal redirection systems 10. The optical signal redirection systems 10 shown include one reflective microstructure array 12 formed on a single substrate 30. However, in other embodiments, there may be two or more reflective microstructure arrays 12 formed on one, two or more substrates 30. Each reflective microstructure array 12 includes one or more reflective microstructures 14. Each of the reflective microstructures 14 includes an optically reflective surface 20 and is positionable with respect to the substrate 30 in order to orient its reflective surface 20 for redirecting optical signals 24 incoming from one or more originating locations 16 to one or more target locations 18. It will be appreciated that, depending upon the direction of propagation of the optical signals 24, an originating location 16 may be a target location 18 and a target location 18 may be an originating location 16. For example, where one of the optical signal redirection systems 10 is configured as an optical cross connect, the originating and target locations 16, 18 may comprise optical ports (e.g., optical fiber ends) between which bi-directional optical signals 24 may be redirected for transmission along desired pathways within an optical telecommunications network.

The orientation required for a given reflective microstructure 14 to redirect an optical signal 24 incoming from an originating location 16 to a target location 18 is defined by a unit normal vector 22 that is normal to the reflective surface 20 of such reflective microstructure 14. For example, as is shown in FIG. 1A, where there is one originating location 16 and one target location 18, each of the four reflective microstructures 14 has one unit normal vector 22 associated therewith. In FIG. 1B where the reflective microstructure array 12 includes two reflective microstructures 14 that are positionable to redirect optical signals 24 from respective originating locations 16 associated therewith to a single target location 18, each of the reflective microstructures has one unit normal vector 22 associated therewith. Where a given reflective microstructure 14 is positionable to redirect optical signals 24 between more than one originating location 16 and/or more than one target location 18, there are multiple unique unit normal vectors 22 associated with such reflective microstructure 14. For example, in FIG. 1C, where the reflective microstructure array 12 includes a single reflective microstructure 14 that is positionable to redirect optical signals 24 from one originating location 16 to two different target locations 18, the single reflective microstructure has two unit normal vectors 22 associated therewith. It will be appreciated that numerous other examples exist.

The unit normal vectors 22 associated with the reflective microstructures 14 form a set of unit normal vectors 22. An average normal vector 26 associated with the reflective microstructure array 12 can thus be defined as the average of the set of unit normal vectors 22. The optical signal redirection systems 10 are referred to as "off axis" because the average normal vector 26 associated with the reflective microstructure array 12 forms a first non-zero angle θ with respect to a vector normal to the surface plane 32 of the substrate 30 (the substrate normal 34). A reflective microstructure array 12 having such a characteristic is referred to herein as an off axis reflective microstructure array 12.

As is shown in FIG. 1A, in addition to the first non-zero angle θ between the average normal vector 26 and the substrate normal 34, the projection 28 of the average normal vector 26 onto the surface 32 of the substrate 30 may also be at a second angle Φ with respect to a reference axis 36 (e.g., the x-axis) on the surface 32 of the substrate 30. It will be appreciated that while the average normal vector 26 forms a first angle θ with the substrate normal 34, an individual unit normal vector 22 may be parallel with the substrate normal 34. Likewise, the projections 28 of each individual unit normal vector 22 onto the surface 32 of the substrate 30 may form non-zero angles Φ with the reference axis 36 or they may be parallel with the reference axis 36.

The reflective microstructures 14 of the off axis reflective microstructure array 12 may be fabricated on the substrate 30 in a number of manners. For example, a reflective microstructure 14 may be supported at three points, two of which are actively controlled with the third being passively supported. The actively controlled points may be controlled using actuator/elevator systems and the passively supported point may be attached to the substrate via a compliant mechanism (e.g., a spring). The passively supported point may be pre-elevated by a pre-stressed elevator, or elevating it by operating an actuator and locking the actuator into place, where it subsequently remains passive. Examples of reflective microstructures 14 having two actively controlled points and one passively supported point are described in co-pending U.S. patent application Ser. No. 09/966,963 entitled "LARGE TILT ANGLE MEM PLATFORM", the disclosure of which is incorporated by reference herein in its entity.

Figure 2A:
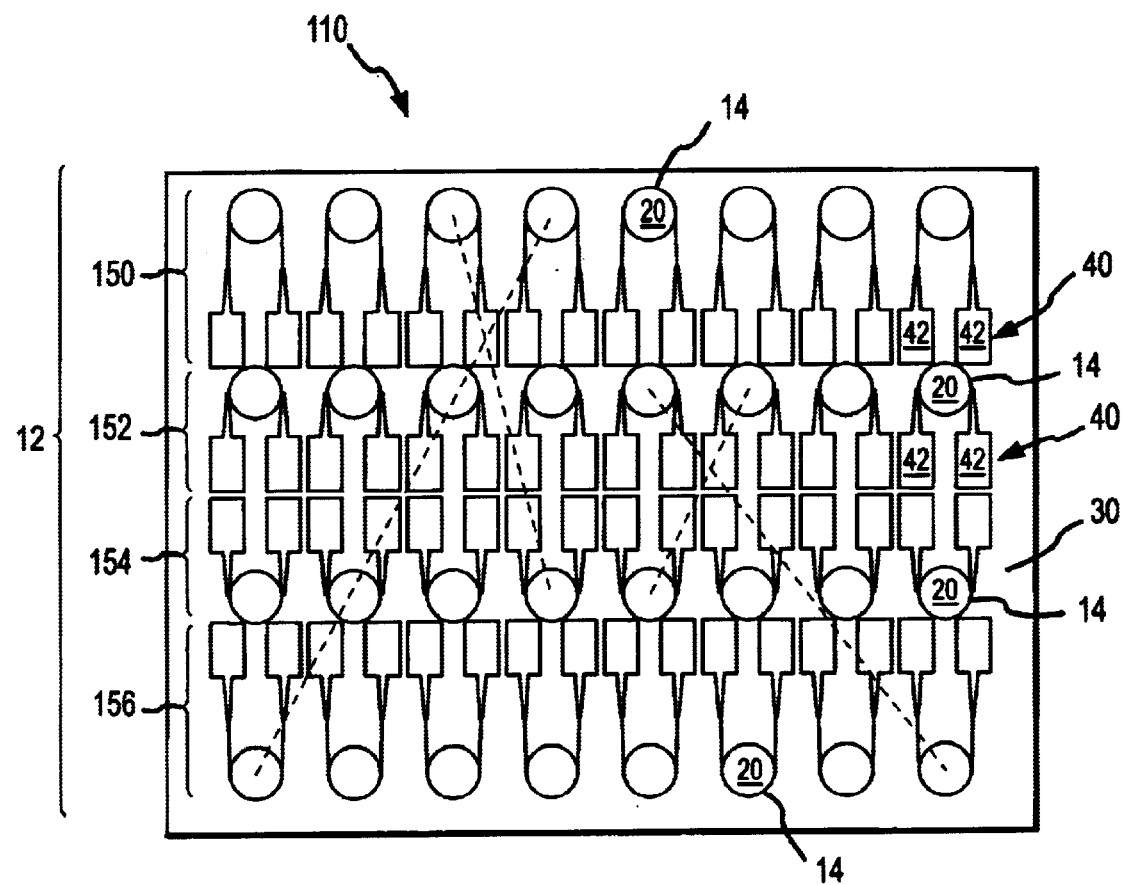
FIGS. 2A–B show top and end views of one embodiment of a single chip 2N OXC architecture incorporating an off axis reflective microstructure array in accordance with the present invention.
Figure 2B:
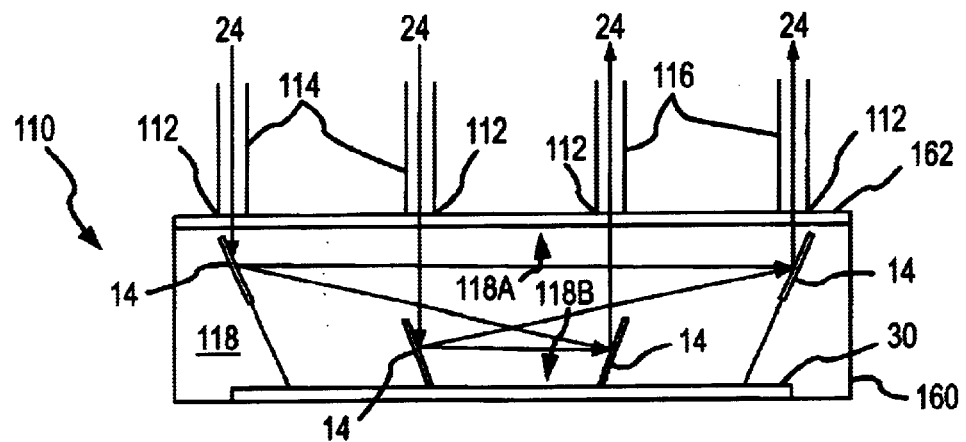

Referring now to FIGS. 2A-B, there are shown top and end views of one embodiment of a single chip 2N OXC 110 where N=16. The single chip 2N OXC 110 is one example of an off axis optical signal redirection system configured for use as an OXC. In this regard, the single chip 2N OXC 110 includes an off axis reflective microstructure array 12 formed on one substrate 30. The reflective microstructure array 12 faces a group of optical ports 112 comprising N input optical fibers 114 and N output optical fibers 116. The single chip 2N OXC 110 is configured redirect optical signals 24 between any one of the input optical fibers 114 and any one of the output optical fibers 116 within a compact free space switch interface 118. In this regard, the switch interface 118 is referred to as "free space" because it does not incorporate optical fibers, waveguides or the like within which the optical signals 24 propagate between switching points (i.e., points where the direction of the optical signals 24 change). Rather, the optical signals 24 propagate through "free space" (e.g., a mixture of gases such as air, a single gas, or a vacuum) between switching points in the switch interface 118. The input and output optical fibers 114, 116 comprising the group of optical ports 112 are located on a first side 118A of the free space switch interface 118, and the substrate 30 on which the off axis reflective microstructure array 12 is formed are located on a second side 118B of the free space switch interface 118 opposite the first side 118A.

The single chip 2N OXC 110 and other OXC architectures described herein are bi-directional devices. In this regard, the terms "input" and "output" are used for purposes of convenience in referring to the optical fibers 114, 116, and are not intended to restrict the single chip 2N OXC 110 and other OXC architectures described herein to unidirectional propagation of optical signals 24 through the switch interface 118. For example, one of the input optical fibers 114 may receive an optical signal 24 redirected to it by the single chip 2N OXC 110 from one of the output optical fibers 116 or vice versa.

The off axis reflective microstructure array 12 of the single chip 2N OXC 110 includes thirty-two reflective microstructures 14 built/assembled on the substrate 30 and thirty two positioning systems 40 associated with the reflective microstructures 14 that are also built/assembled on the substrate 30. In this regard, the reflective microstructures 14 and positioning systems 40 may be built/assembled on the substrate 30 using surface micromachining techniques such as described in U.S. Pat. Nos. 5,783,340, issued Jul. 21, 1998, and entitled "METHOD FOR PHOTOLITHOGRAPHIC DEFINITION OF RECESSED FEATURES ON A SEMICONDUCTOR WAFER UTILIZING AUTOFOCUSING ALIGNMENT"; 5,798,283, issued Aug. 25, 1998, and entitled "METHOD FOR INTEGRATING MICROELECTROMECHANICAL DEVICES WITH ELECTRONIC CIRCUITRY"; 5,804,084, issued Sep. 8, 1998, and entitled "USE OF CHEMICAL POLISHING IN MICROMACHINING"; 5,867,302, issued Feb. 2, 1999, and entitled "BISTABLE MICROELECTROMECHANICAL ACTUATOR"; and 6,082,208, issued Jul. 4, 2000, and entitled "METHOD FOR FABRICATING FIVE-LEVEL MICROELECTROMECHANICAL STRUCTURES AND MICROELECTROMECHANICAL TRANSMISSION FORMED", the entire disclosures of which are incorporated by reference herein in their entirety. It will be appreciated that in addition to surface micromachining, a number of other microfabrication technologies may be appropriate for use in fabricating the reflective microstructures 14 and positioning systems 40. Such microfabrication technologies include lithography galvanoforming abforming (LIGA), sacrificial LIGA (SLIGA), bulk micromachining, mold micromachining, micro-electrodischarge machining (EDM), laser micromachining, 3-D stereolithography, and other techniques used to fabricate microstructures on substrates.

Each reflective microstructure 14 includes a reflective surface 20 and is associated with a separate one of the input optical fibers 114 or the output optical fibers 116. For purposes of reference, a reflective microstructure 14 that is associated with one of the input optical fibers 114 is referred to herein as an "input reflective microstructure", and a reflective microstructure 14 that is associated with one of the output optical fibers 116 is referred to herein as an "output reflective microstructure." As with the optical fibers 114, 116, the use of the terms "input" and "output" when referring to the reflective microstructures 14 is not intended to restrict the single chip 2N OXC 110 to unidirectional propagation of optical signals 24 through the switch interface 118.

The reflective microstructures 14 (and their associated positioning systems 40) are arranged in four rows on the substrate 30: (1) an outer row 150 of output reflective microstructures 14; (2) an inner row 152 of output reflective microstructures 14; (3) an inner row 154 of input reflective microstructures 14; and (4) an outer row 156 of input reflective microstructures 14. Each row 150–156 includes N/2 reflective microstructures 14. Each positioning system 40 is operable in response to appropriate control signals to both elevate its associated reflective microstructure 14 above the surface of the substrate 30 and to tilt its associated reflective microstructure 14 with two degrees of freedom (e.g., about two substantially orthogonal axes of rotation) with respect to the surface of the substrate 30. The control signals may be supplied to the positioning systems 40 via electrical interconnects (not shown) formed on the substrate 30. By elevating the reflective microstructures 14 above the surface of the substrate 30, substantial tilt angles (in excess of 45 degrees) are achievable. In this regard, FIG. 2C shows an exemplary positioning system 40 capable of both elevating and tilting an associated reflective microstructure 14.

Figure 2C:
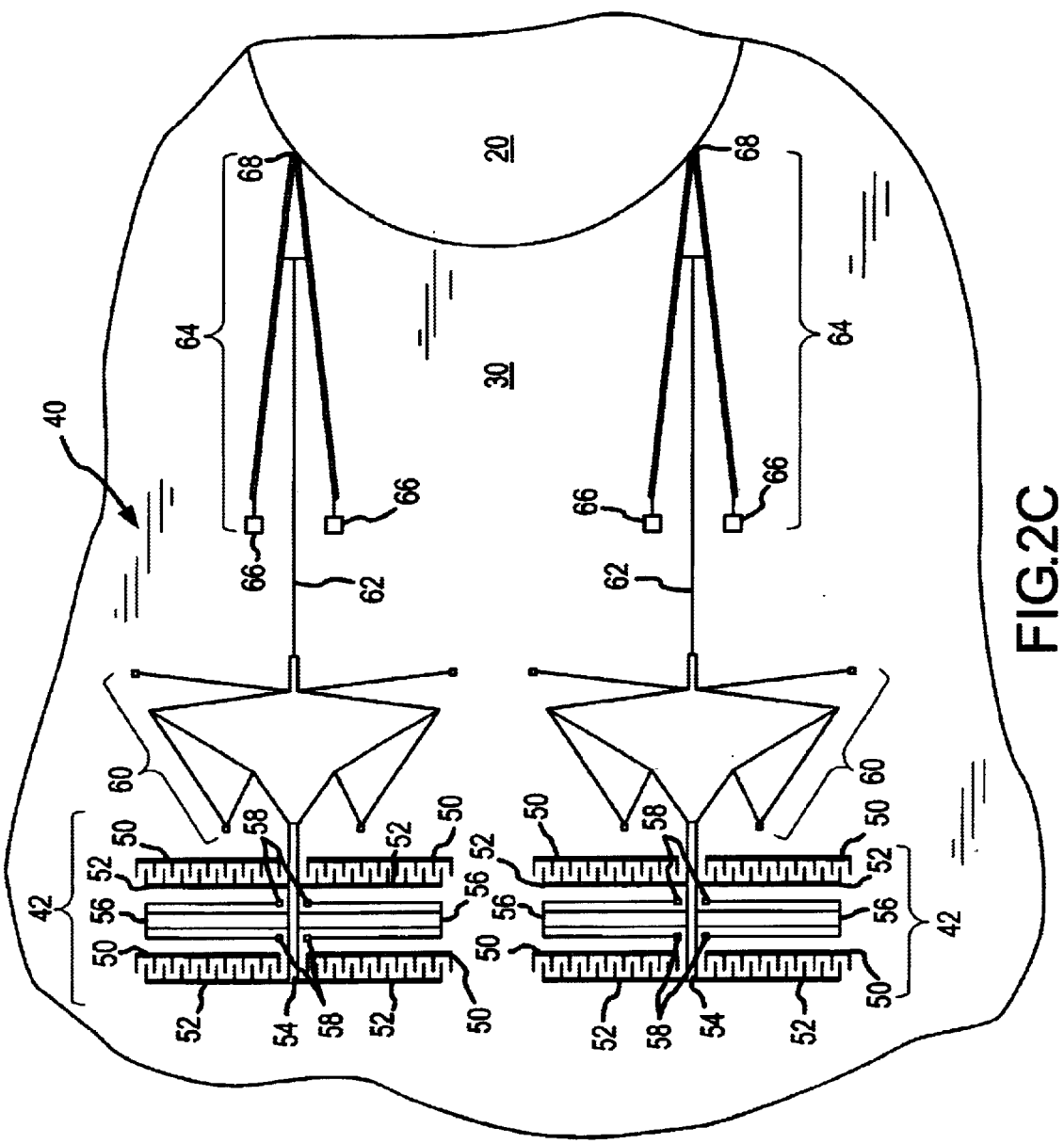
FIG. 2C shows a top view of an exemplary positioning system for positioning an associated one of the reflective microstructures of the single chip 2N OXC of FIGS. 2A–B.

Referring now to FIG. 2C, there is shown a top view of an exemplary positioning system 40. Each positioning system 40 of the single chip 2N OXC 110 is configured in a similar fashion and includes a pair of electrostatic actuator microstructures 42. Each actuator microstructure 42 includes several stationary combs 50 that are fixed to the substrate 30 and several moveable combs 52 that are attached to a moveable frame 54. The moveable frame 54 is supported above the substrate 30 by a folded support spring 56 anchored to the substrate 30 at four anchor points 58 to permit lateral movement of the frame 54. Upon application of a control voltage via electrical interconnects (not shown) across the combs 50, 52, the moveable combs 52 are pulled laterally towards the stationary combs 50 thereby moving the frame 54 laterally. The amount of lateral movement corresponds with the magnitude of the actuation voltage applied. The frame 54 is coupled through a displacement multiplier 60 to a tether 62. The tether 62 is connected to an A-frame structure 64. The A-frame structure 64 is anchored at its base 66 to the substrate 30 and is connected (e.g., by a compliant member) at its apex 68 to the reflective microstructure 14. Instead of being connected at its apex 68 to the reflective microstructure 14, the A-frame structure 64 may include a rigid extension arm (not shown) extending from its apex 68 which is connected at an opposite end thereof to the reflective microstructure 14. The displacement multiplier 60 amplifies the small lateral movement of the moveable frame 54 and also phase shifts the movement of the frame 54 by 180 degrees (i.e., lateral movement of the frame 54 to the right becomes lateral movement of the tether 62 to the left, and vice versa).

Because the A-frame structure 64 is anchored to the substrate 30 at its base 66, when the tether 62 is moved laterally, the apex 68 (and rigid extension arm, if any) of the A-frame structure 64 is rotated upwardly through an arc to apply upward force to the reflective microstructure 14 to lift the reflective microstructure 14 where it is attached to the A-frame structure 64 (or rigid extension arm, if any). In essence, the A-frame structures 64 (and rigid extension arms, if any) act as lever arms. The longer the lever arms comprised by the A-frame structures 64 (and rigid extension arms, if any) are, the greater the amount of upward displacement of the reflective microstructure 14 for a given angular displacement of the lever arm.

In addition to being connected to the A-frame structures 64, the reflective microstructure 14 may also be attached in a pivotable manner (e.g., by a compliant member) to the substrate 30. Since, the apexes 68 (or rigid extension arms) of the A-frame structures 64 are connected to different locations on the reflective microstructure 14, the reflective microstructure 14 can be tilted with one degree of freedom by applying equal actuation voltages to the combs 50, 52. Tilting of the reflective microstructure 14 with two degrees of freedom can be achieved by applying unequal actuation voltages to the combs 50, 52. With positioning systems 40 configured as described, large tilt angles (e.g., in excess of 45 degrees) may be achieved. In this regard, the positioning systems 40 and reflective microstructures 14 may be configured as is described in greater detail in the "LARGE TILT ANGLE MEM PLATFORM" application.

Referring again to FIGS. 2A–B, each positioning system 40 associated with the output reflective microstructures 14 in the outer row 150 of output reflective microstructures 14 is configured to elevate the output reflective microstructures 14 in the outer row 150 a sufficient distance from the surface of the substrate 30 so as to provide a line of sight over the output reflective microstructures 14 in the inner row 152 of output reflective microstructures 14 to each of the input reflective microstructures 14 in the inner and outer rows 154, 156 of input reflective microstructures 14. Each positioning system 40 associated with the input reflective microstructures 14 in the outer row 156 of the input reflective microstructures 14 is configured to elevate the input reflective microstructures 14 in the outer row 156 a sufficient distance from the surface of the substrate 30 so as to provide a line of sight over the input reflective microstructures 14 in the inner row 154 of input reflective microstructures 14 to the output reflective microstructures 14 in the outer and inner rows 150, 152 of output reflective microstructures 14. By tilting the reflective microstructures 14 at appropriate angles with respect to the substrate 30, an optical signal 24 can be directed through the switch interface 118 between any one of the input optical fibers 114 and any one of the output optical fibers 116.

Figure 3A:
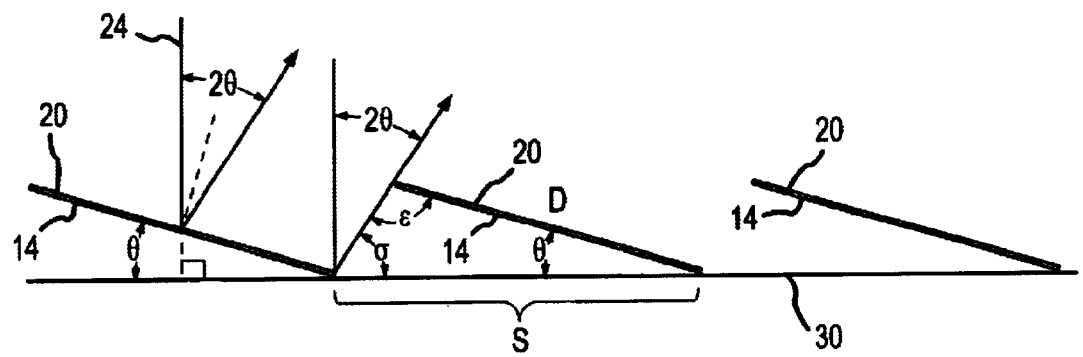
FIG. 3A is a side view of several adjacent reflective microstructures showing the geometry used in deriving a relationship between the minimum pitch and the maximum tilt angle of the adjacent reflective microstructures.
Figure 3B:
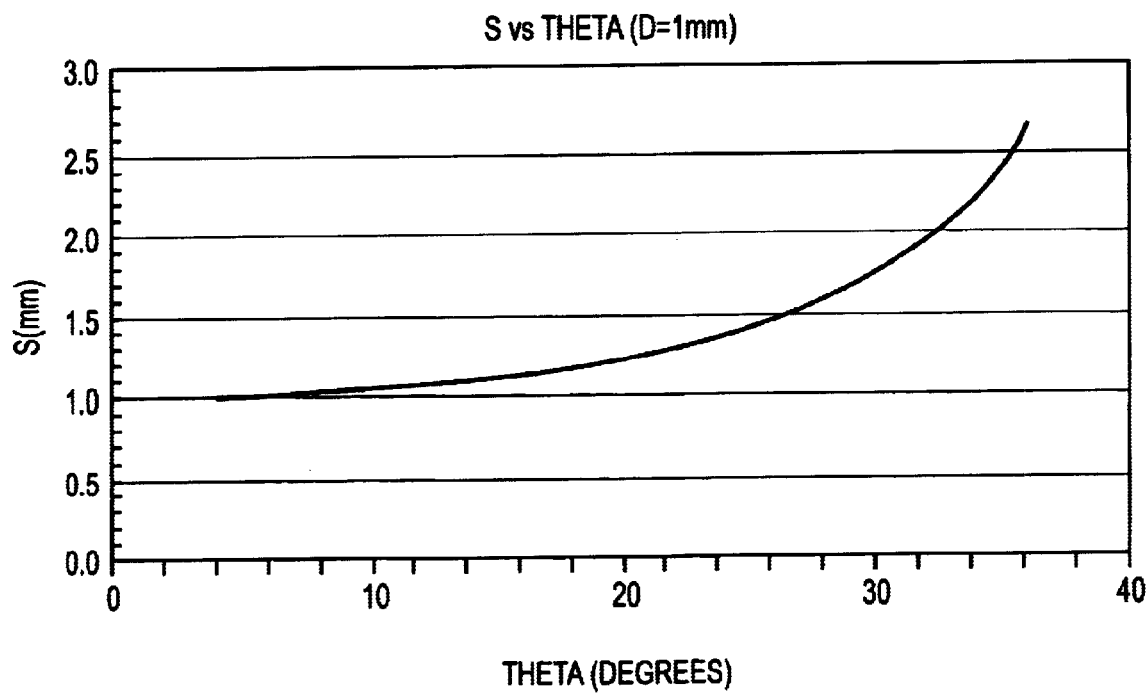
FIG. 3B shows a plot of the relationship between the minimum pitch and maximum tilt angle of the adjacent reflective microstructures of FIG. 3A.

Referring now to FIGS. 3A–B, it will be appreciated that when a reflective microstructure 14 is inclined at a tilt angle θ with respect to the surface of the substrate 30, an optical signal 24 that is normal to the substrate 30 will be reflected from the optically reflective surface 20 of the reflective microstructure 14 at an angle equal to twice the tilt angle θ (i.e. at an angle of 2θ). Thus, it is important that the reflective microstructures 14 be sufficiently spaced apart from one another on the surface of the substrate 30 so that adjacent reflective microstructures 14 do not obstruct the optical signals 24 reflected from neighboring reflective microstructures 14. The spacing required can be defined in terms of the pitch S of the reflective microstructures 14. The pitch S of the reflective microstructures 14 is defined as the lateral distance on the substrate 30 from an edge of one of the reflective microstructures 14 (e.g., the right edge) to the corresponding edge (e.g., the right edge) of its adjacent neighbor. The pitch S thus is the sum of the projection (i.e., Dcosθ) onto the substrate 30 of the diameter D of the reflective microstructure 14 (for a circular reflective microstructure) plus the space between the reflective microstructure 14 and its adjacent neighbor. D may represent different dimensions depending upon the shape of the reflective microstructures 14 and their orientation with respect to the axis about which they are tilted. For example, in the case of elliptical reflective microstructures 14, D may be the distance from one edge of the reflective microstructure 14 to the opposite edge along either the major or minor axis of the ellipse, or in the case of rectangular reflective microstructures 14, D may be the length or width of the rectangle. The pitch S indicates how many reflective microstructures 14 of relevant dimension D can fit within a given area on the substrate and thus controls the density of the input or output optical fibers 114, 116.

The relationship between the tilt angle θ of the reflective microstructures 14 with respect to the substrate 30 and the pitch S of the reflective microstructures 14 may be derived in the following manner. Defining the following angles from the geometry shown in FIG. 3A:

$$\sigma = \frac{\pi}{2} - 2\theta \quad (1)$$

$$\varepsilon = \pi - \sigma - \theta = \frac{\pi}{2} + \theta \quad (2)$$

Applying the law of sines:

$$\frac{D}{\sin\sigma} = \frac{S}{\sin\varepsilon} \quad (3)$$

Then substituting and simplifying one obtains the following equation for the minimum allowable pitch S:

$$S \geq D \frac{\cos\theta}{\cos 2\theta} \quad (4)$$

A plot of the pitch S versus the tilt angle θ of the reflective microstructures 14 with respect to the substrate 30 for a reflective microstructure 14 with dimension D of 1 mm is shown in FIG. 3B. As the plot of FIG. 3B shows, increasing the tilt angle θ of the reflective microstructures 14 requires an increasing pitch S. Further, the relationship between the tilt angle θ and pitch S is non-linear.

Figure 4A:
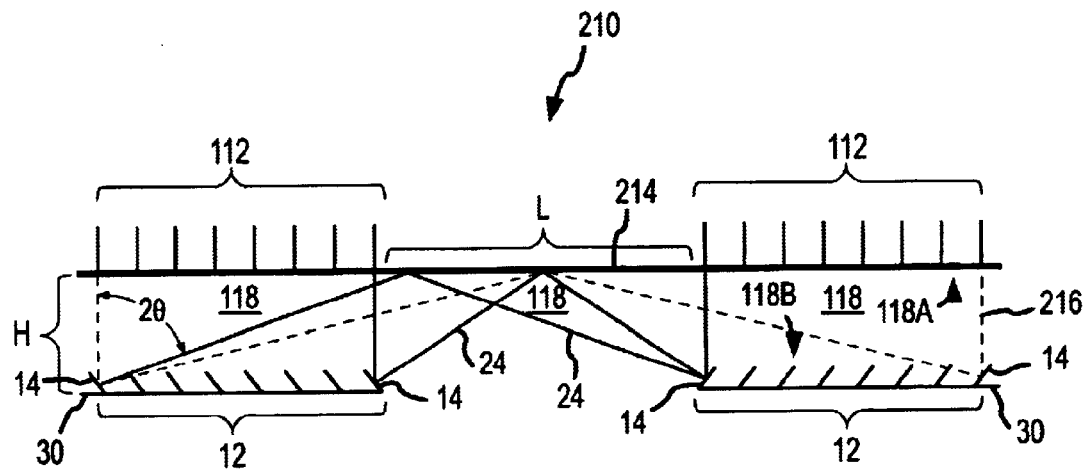
FIGS. 4A–B show end and top views of one embodiment of a multi-substrate 2N OXC architecture incorporating off axis reflective microstructure arrays in accordance with the present invention.
Figure 4B:
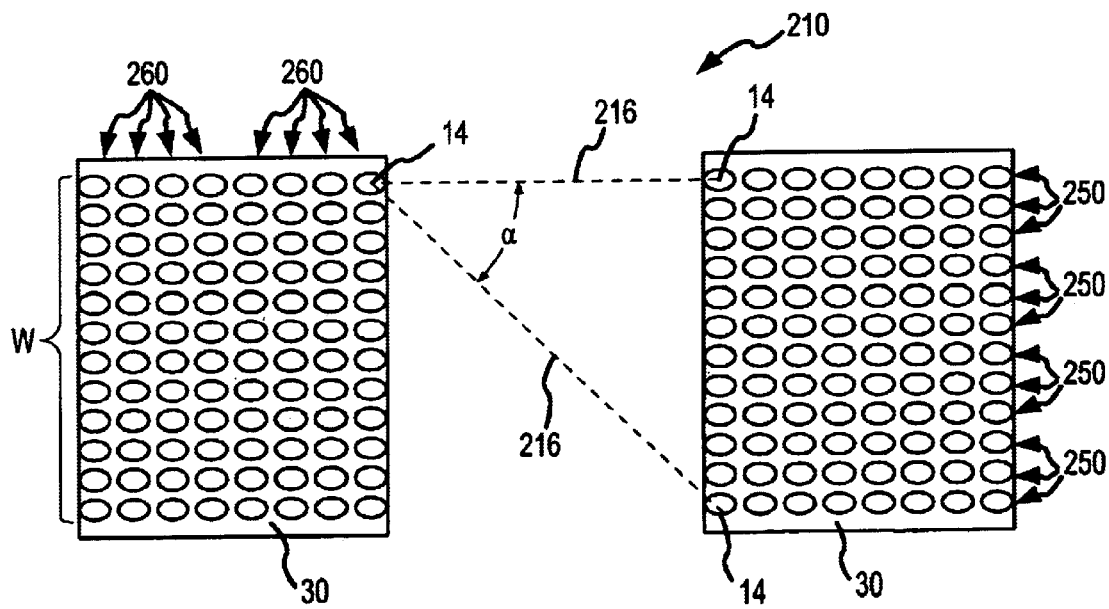

Referring now to FIGS. 4A–B, there are shown end and top views of one embodiment of a multi-substrate 2N OXC 210 where N=96. The multi-substrate 2N OXC 210 is another example of an off axis optical signal redirection system configured for use as an OXC. The multi-substrate 2N OXC 210 is operable to direct optical signals 24 between two separate groups of optical ports 112. The two groups of optical ports 112 may be comprised of input and/or output optical fibers 114, 116. Both groups of optical ports 112 are located on a first side 118A of the free space switch interface 118 and both substrates 30 are located on a second side 118B of the switch interface 118.

The multi-substrate 2N OXC 210 includes two separate substrates 30 arranged in a side-by-side fashion. Each substrate 30 has an off axis reflective microstructure array 12 formed on a surface thereof facing an associated group of optical ports 112. The reflective microstructures 14 within each array 12 are arranged in a plurality of rows 250 (e.g., twelve) and columns 260 (e.g., eight) on the surfaces of the substrates 30. Each substrate 30 may be rectangular as is shown with dimensions L and W. Dimension L is determined by the number of rows 250 and the required pitch S along the rows 250. Dimension L is given by the following expression:

$$L = mS = mD \frac{\cos\theta}{\cos 2\theta} \quad (5)$$

where m is the number of reflective microstructures 14 in the rows 250 of reflective microstructures 14 on each substrate 30.

The groups of optical ports 112 are laterally spaced apart from one another by an amount equal to L and the substrates 30 are also laterally spaced apart from one another by the same amount as the groups of optical fibers 112. An intermediate fixed reflective surface 214 is disposed between the groups of optical ports 112. The intermediate fixed reflective surface 214 and the groups of optical ports 112 are positioned at a height H above the surfaces of the substrates 30. The intermediate fixed reflective surface 214 faces towards the substrates 30 to provide optical signal pathways 216 between any one of the reflective microstructures 14 of one of the substrates 30 and any one of the reflective microstructures 14 of the other substrate 30 via the fixed reflective surface 214. In other embodiments, the groups of optical ports 112 (and also the substrates 30) may be laterally spaced apart from one another by more or less than L so long as a fixed reflective surface 214 is of sufficient size to provide the required optical pathways 216 between the reflective microstructures 14 on the substrates 30 is positionable therebetween. Also, in other embodiments, the fixed reflective surface 214 and the groups of optical ports 112 may be positioned at different heights above the substrates 30. For example, so long as they do not obstruct the optical pathways 216 between the furthest apart reflective microstructures 14, the groups of optical ports 112 may be disposed closer to the substrates 30 than the fixed reflective surface 214.

An expression for the distance H between the fixed reflective surface 214 and the surfaces of the substrates 30 can be obtained from the geometry of the multi-substrate 2N OXC 210 and the row pitch S. From the geometry shown in FIG. 4A the following expression is obtained, $$\frac{2\sin\theta\cos\theta}{\cos 2\theta} = \frac{\sin 2\theta}{\cos 2\theta} = \tan 2\theta = 1.5 \frac{L}{H} \quad (6)$$

$$= 1.5 \frac{mS}{H} \geq 1.5 \frac{m}{H} D\cos\frac{\theta}{\cos 2\theta}$$

and simplifying one obtains:

$$H \geq 0.75 \frac{mD}{\sin\theta} \quad (7)$$

Thus, H is a function of the tilt angle θ, the number m of reflective microstructures 14 in the rows 250 of reflective microstructures 14 and dimension D of the reflective microstructures 14. By way of example, where m=8, D=1 mm and θ=30 degrees, then H=12 mm and L=14 mm.

In addition to having a front-to-back tilt angle θ requirement, each reflective microstructure 14 on one of the substrates 30 also has a side-to-side tilt angle α requirement in order to direct and receive optical signals 24 via the fixed reflective surface 214 to and from any one of the reflective microstructures 14 on the other substrate 30. It will be appreciated that reflective microstructures 14 in the column 260 adjacent to the space between the two substrates 30 must have the greatest side-to-side tilt in order to direct and receive optical signals via the fixed reflective surface 214 to and from any one of the reflective microstructures 14 on the other substrate 30. In this regard, the side-to-side tilt angle a required is given by the following expression:

$$|\alpha| \geq \arctan\left(\frac{W}{L}\right) \quad (8)$$

where W is given by:

$$W = nS' \quad (9)$$

where n is the number of reflective microstructures 14 in the columns 260 and S' is the pitch of the reflective microstructures 14 along the columns 260 (which may be different that the pitch S of the reflective microstructures 14 along the rows 250, particularly for elliptical reflective microstructures 14 as shown). From equation (9), an expression for the maximum pitch S' along the columns 260 is given by:

$$S' \le \frac{m}{n} S \tan(\alpha) \quad (10)$$

Figure 4C:
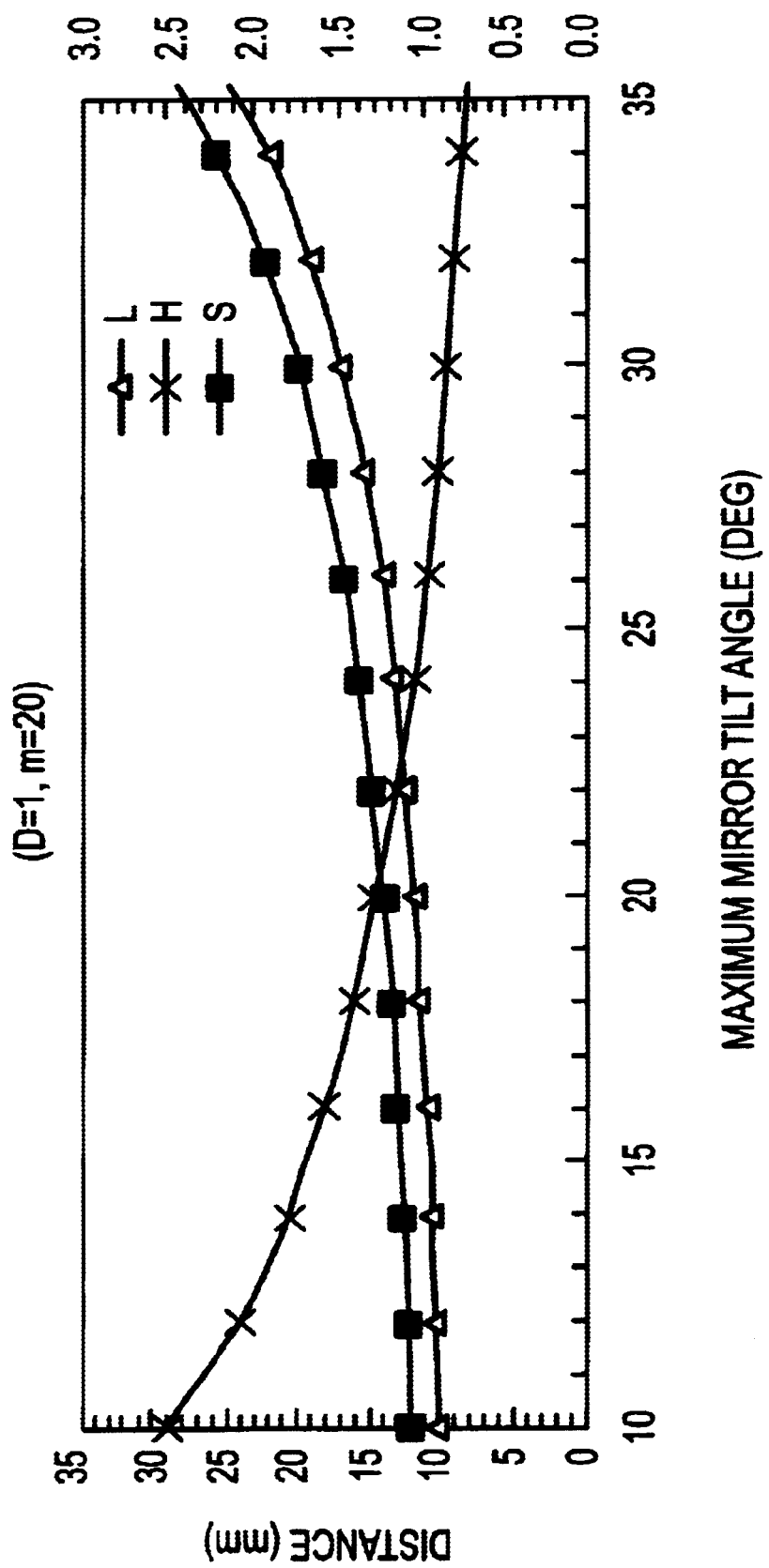
FIG. 4C shows a plot of various geometrical considerations versus the maximum tilt angle of the reflective microstructures for the multi-substrate 2N OXC of FIGS. 4A–B.

FIG. 4C shows a plot of dimension L, height H and pitch S in millimeters versus the maximum reflective microstructure 14 front-to-back tilt angle θ in degrees for reflective microstructures 14 of dimension D=1 mm and number of rows m=20. The scale for dimensions L and H is on the left vertical axis and the scale for pitch S is on the right vertical axis. As the plot of FIG. 4C shows, increasing the reflective microstructure 14 front-to-back tilt angle θ increases dimension L and pitch S in a non-linear manner while decreasing height H in a non-linear manner.

Figure 5A:
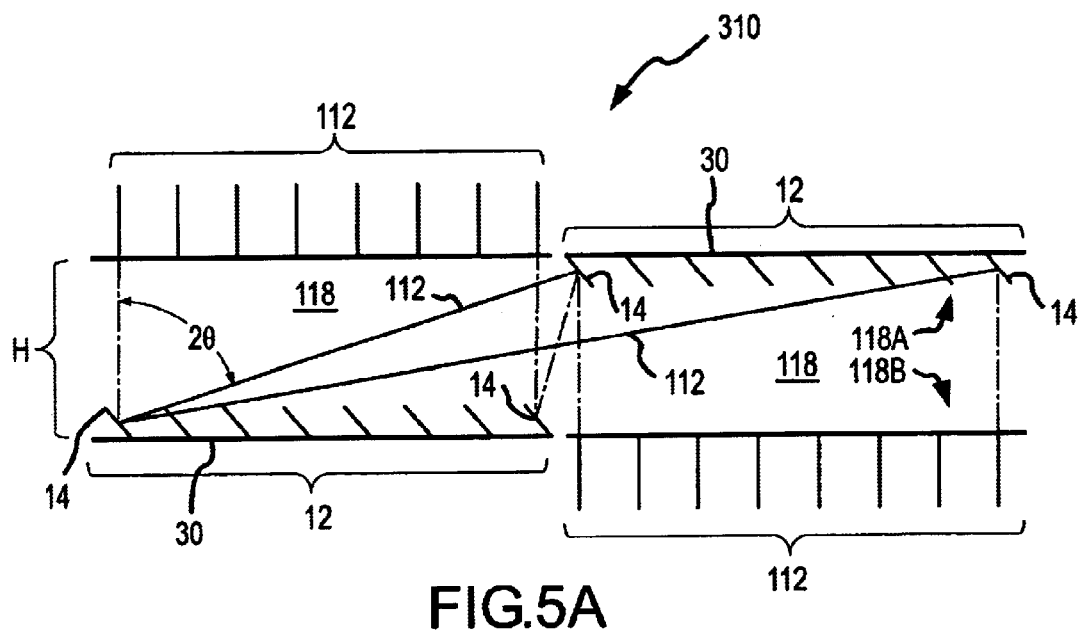
FIGS. 5A–B show end and top views of another embodiment of a multi-substrate 2N OXC architecture incorporating off axis reflective microstructure arrays in accordance with the present invention.
Figure 5B:
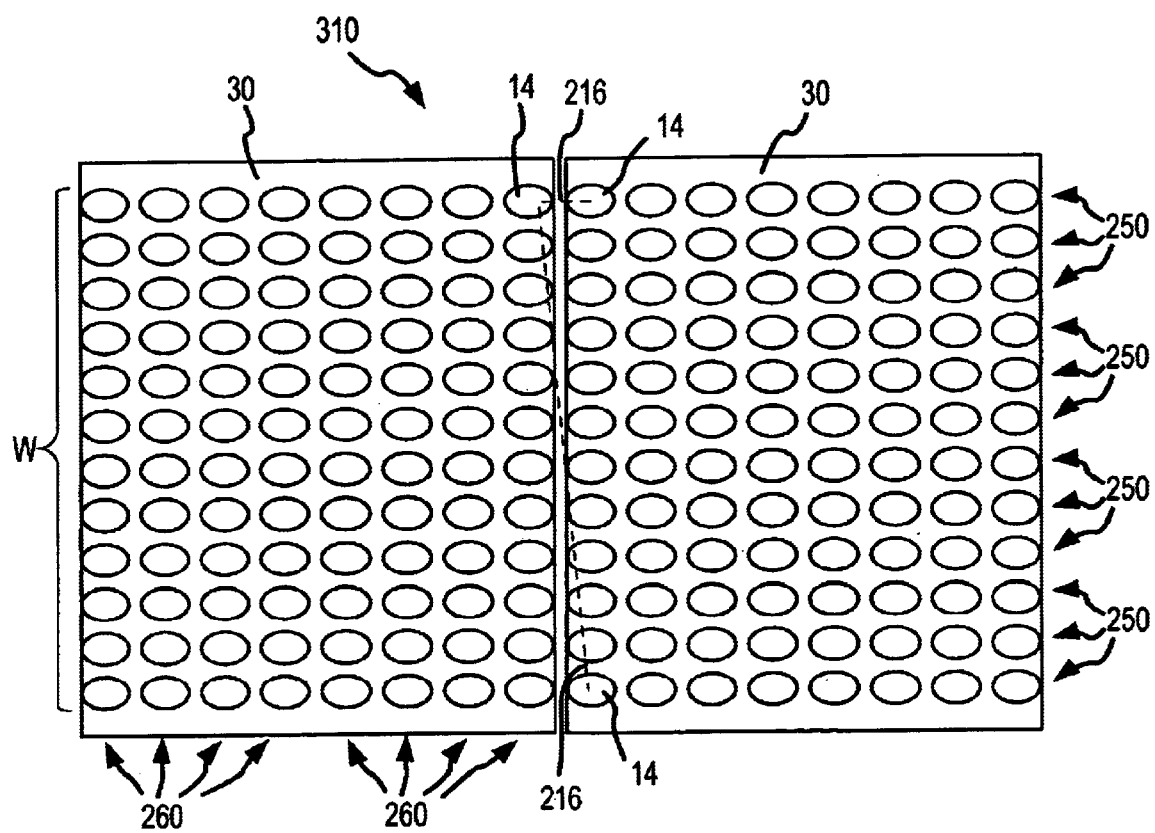

Referring now to FIGS. 5A–B, there are shown end and top views of another embodiment of a multi-substrate 2N OXC 310 where N=96. The multi-substrate 2N OXC 310 is a further example of an off axis optical signal redirection system configured for use as an OXC. The multi-substrate 2N OXC 310 is operable to direct optical signals 24 between two separate groups of optical ports 112. The two groups of optical ports 112 may be comprised of input and/or output optical fibers 114, 116. The multi-substrate 2N OXC 310 includes two separate substrates 30, however, the intermediate fixed reflective surface 214 of the multi-substrate 2N OXC 210 of FIGS. 4A–B is eliminated by flipping the orientation of one substrate 30 and one group of optical ports 112. In this regard, one of the substrates 30 and one of the groups of optical ports 112 are arranged in a side-by-side fashion on a first side 118A of the switch interface 118 and the other substrate 30 and group of optical ports 112 are arranged in a side-by-side manner on a second side 118B of the switch interface 118. The substrate 30 and group of optical ports 112 on the first side 118A side of the switch interface 118 are separated from the substrate 30 and group of optical ports 112 on the second side 118B side of the switch interface 118 by a distance H which will be referred to herein as the height H of the group of optical ports 112 above the corresponding substrate 30 on the other side of the switch interface 118.

Each substrate 30 includes an off axis reflective microstructure array 12 formed on a surface of the substrate 30 that faces the group of optical ports 112 on the opposing side of the switch interface 118. The reflective microstructures 14 within each array 12 are arranged in a plurality of rows 250 (e.g., twelve) and columns 260 (e.g., eight) on the surfaces of the substrates 30. Each substrate 30 may be rectangular as is shown with dimensions L and W. Dimension L is determined by the number m of reflective microstructures 14 in the rows 250 and the pitch S along the rows 250 (i.e., L=mS), and dimension W is determined by the number n of reflective microstructures 14 in the columns 260 and the pitch S' along the columns 260 (i.e., W=nS').

Since no intermediate fixed reflective surface is needed, the substrates 30 and groups of optical ports 112 can be positioned adjacent to one another with little or no lateral spacing therebetween. Optical signals 24 are redirected between any selected optical port in one of the groups of optical ports 112 and any selected optical port of the other group of optical ports 112 by tilting the pair of reflective microstructures 14 associated with the selected optical ports at appropriate front-to-back and side-to-side tilt angles θ, α with respect their respective substrates 30 to provide an optical signal pathway 216 between the selected optical ports. From the geometry shown in the end view of FIG. 5A and the pitch S of the reflective microstructures 14 along the rows 250, an expression for the height H may be obtained as follows:

$$\frac{2\sin\theta\cos\theta}{\cos2\theta} = \frac{\sin2\theta}{\cos2\theta} = \tan2\theta = 2\frac{L}{H} = 2\frac{mS}{H} \ge 2\frac{m}{H}D\cos\frac{\theta}{\cos2\theta} \quad (11)$$

and simplifying one obtains:

$$H \ge \frac{mD}{\sin\theta} \quad (12)$$

Thus, H is a function of the tilt angle θ, the number m of reflective microstructures 14 in the rows 250 of reflective microstructures 14 and dimension D of the reflective microstructures 14. By way of example, where m=8, D=1 mm and θ=30 degrees, then H=16 mm and L=14 mm. Thus, for the same number m of rows 250, reflective microstructure dimension D and tilt angle θ, the required height H is greater for the optical switch architecture 310 shown in FIGS. 5A–B than for the optical switch architecture 210 shown FIGS. 4A–B that includes the intermediate fixed reflective surface 214.

The maximum allowable side-to-side tilt angle α requirement for the multi-substrate 2N OXC 310 may be derived in a similar manner to that for the multi-substrate 2N OXC 210 illustrated in FIGS. 4A–B, and is given by:

$$\alpha = \arctan\left(\frac{W}{0}\right) = \arctan(\infty) = 90 \text{ deg} \quad (13)$$

where it has been assumed that the lateral spacing between the substrates 30 is zero. In practice however, it may be desirable to space the adjacent substrates 30 apart by a small amount, particularly where dual actuator lever arm positioning systems, such as described in the previously incorporated "LARGE TILT ANGLE MEM PLATFORM" application, are used to position the reflective microstructures 14 in the required orientations. Spacing the substrates 30 apart by a small amount as is shown in FIGS. 5A–B, allows for tilting of the reflective microstructures 14 side-to-side by α≈±90 degrees while also permitting front-to-back tilting of the reflective microstructures 14 by θ>0 as is required.

Figure 5C:
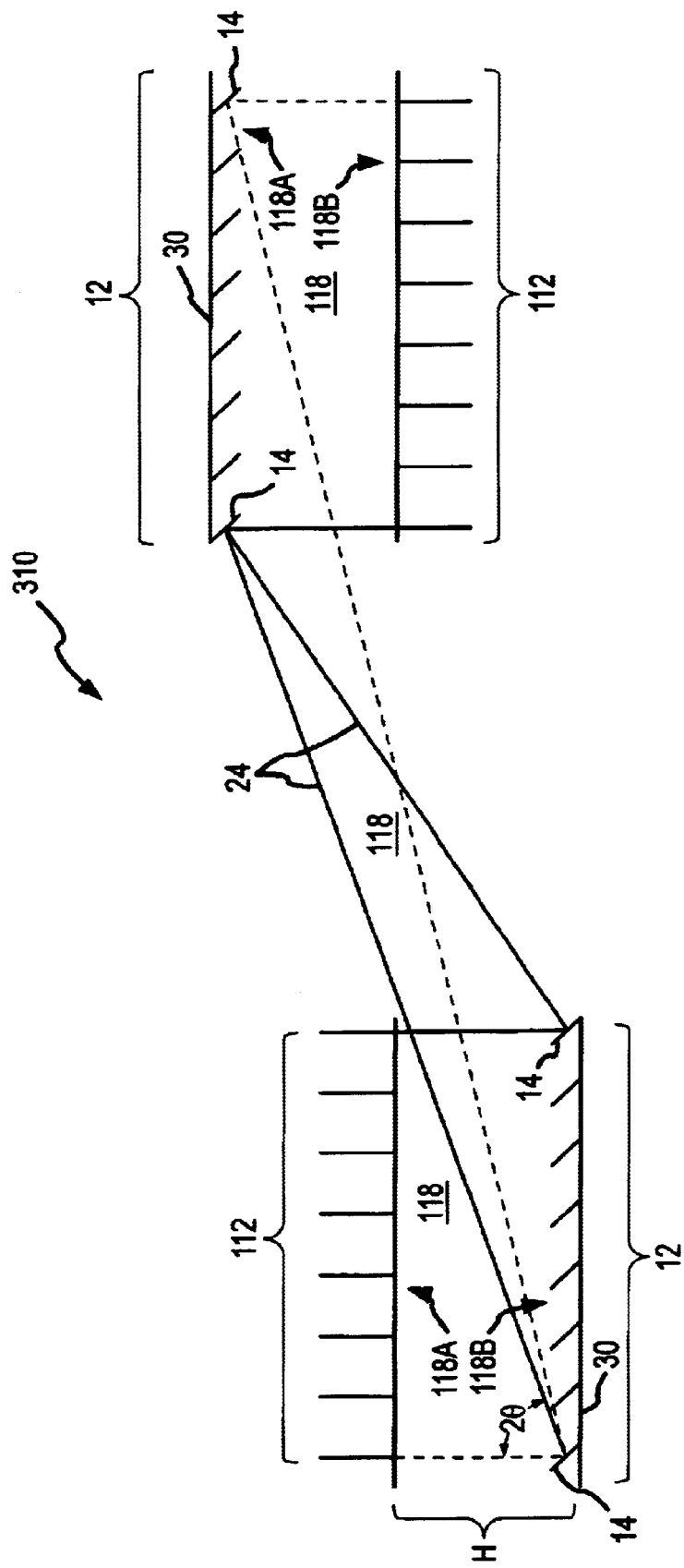
FIG. 5C shows an end view of a further embodiment of a multi-substrate 2N OXC architecture incorporating off axis reflective microstructure arrays in accordance with the present invention.

Referring now to FIG. 5C, the substrates 30 and groups of optical ports 112 of a multi-substrate 2N OXC 310 without a fixed reflective surface such as shown in FIGS. 5A–B need not be positioned immediately adjacent to one another. Furthermore, the substrate 30 and group of optical ports 112 on each side 118A–B of the switch interface 118 need not be coplanar with one another. Rather, as is illustrated in the end view of FIG. 5C, the substrate 30 and group of optical ports 112 on each side 118A–B of the switch interface 118 may be laterally separated from one another and may be positioned to lie in separate parallel, as is shown, or non-parallel planes. As with the embodiment of the multi-substrate 2N OXC 310 shown in FIGS. 5A–B, relationships for tilt angle, minimum pitch, and other requirements can be derived.

Referring now to FIGS. 6A–B, there is shown top and isometric views of one more embodiment of a multi-substrate 2N OXC 410 where N=32. The multi-substrate 2N OXC 410 is yet another example of an off axis optical signal redirection system configured for use as an OXC. The multi-substrate 2N OXC 410 is operable to redirect optical signals 24 between two separate groups of optical ports 112. The two groups of optical ports 112 may be comprised of input and/or output optical fibers 114, 116. As with the multi-substrate 2N OXC 310 of FIGS. 5A–B, the multi-substrate 2N OXC 410 includes two separate substrates 30 having off axis reflective microstructure arrays 12 formed thereon, with the reflective microstructures 14 in each array 12 being arranged in a plurality of rows 250 and columns 260. The intermediate fixed reflective surface 214 of the multi-substrate 2N OXC 210 of FIGS. 4A–B is eliminated by arranging the substrates 30 and groups of optical ports 112 on four sides 118A–D of a polyhedral free space switch interface 118. In this regard, the two substrates 30 may be orthogonal to each other and the two groups of optical ports 112 may be orthogonal to each other around a cubical free space switch interface 118. However, the substrates 30 and groups of optical ports 112 may be arranged in other polyhedral configurations.

An optical signal 24 is directed between any selected optical port of one of the groups of optical ports 112 and any selected optical port of the other group of optical ports 112 by orienting the reflective microstructures 14 associated with the selected optical ports to provide an optical signal pathway 216 extending diagonally between the reflective microstructures 14 on the orthogonally oriented substrates 30. As with the previously described embodiments, the geometrical aspects of the multi-substrate 2N OXC 410 (e.g., the length L and width W of the substrates 30, the pitch S, S' of the reflective microstructures 14 along the rows 250 and columns 260, the dimensions of the reflective microstructures 14, and the diagonal separation between the substrates 30) can be modified to accommodate the tilt angle capabilities of the reflective microstructures 14. It will be appreciated that cubical arrangement of the substrates 30 and groups of optical ports 112 in the multi-substrate 2N OXC 410 provides for relatively short optical signal pathways 216 within the free space switch interface 118. Having relatively short optical signal pathways 216 results in reduced optical signal losses and can allow for the use of potentially less expensive system components because alignment tolerances become less tight.

Figure 7:
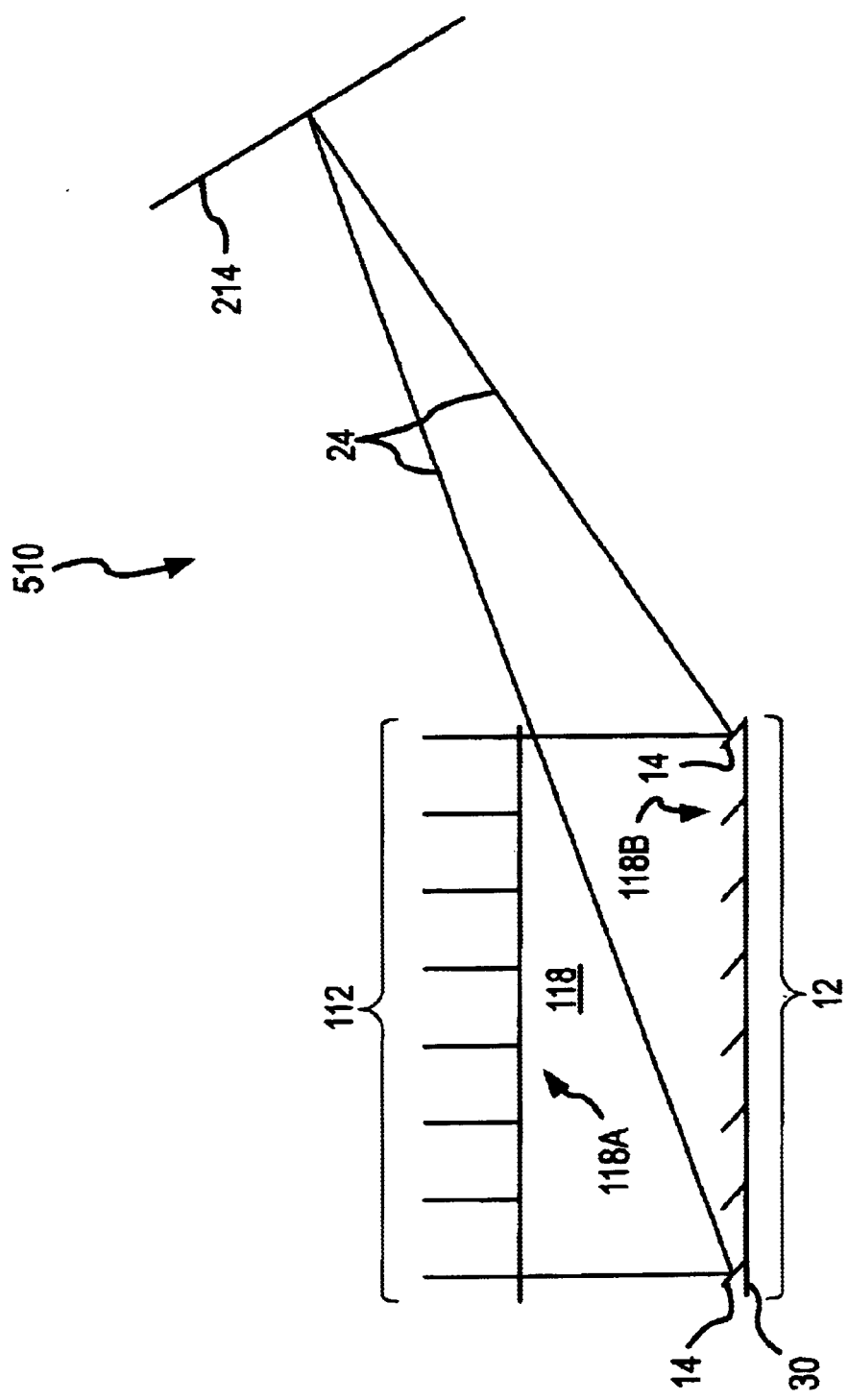
FIG. 7 shows an end view of another embodiment of a single chip 2N OXC architecture incorporating an off axis reflective microstructure array in accordance with the present invention.

Referring now to FIG. 7, there is shown an end view of one embodiment of single chip 2N OXC 510 which includes a fixed reflective surface 214 positioned to the side of the substrate 30 and group of optical ports 112. The single chip 2N OXC 610 of FIG. 7 is one more example of an off axis optical signal redirection system configured for use as an OXC. The single chip 2N OXC 510 includes an off axis reflective microstructure array 12 formed on a substrate 30 facing the group of optical ports 112. An optical signal 24 is redirected from one of the optical ports 112 to another one of the optical ports 112 by positioning at least a pair of reflective microstructures 14 of the off axis reflective microstructure array 12 in respective appropriate orientations. The reflective microstructure 14 associated with the incoming optical port 112 is positioned to reflect the optical signal 24 to a location on the fixed reflective surface 214 wherein the optical signal 24 is reflected therefrom to the reflective microstructure 14 associated with the outgoing optical port 112. In this regard, the fixed reflective surface 214 can be shaped in a number of manners (e.g., flat, concave, convex), with such shape being selected to compensate for optical properties of the other portions of the OXC in order to minimize optical signal 24 losses. The reflective microstructure 14 associated with the outgoing optical port 112 is positioned to receive the optical signal 24 from the fixed reflective surface 214 and reflect the optical signal 24 to its associated optical port 112.

Figure 8:
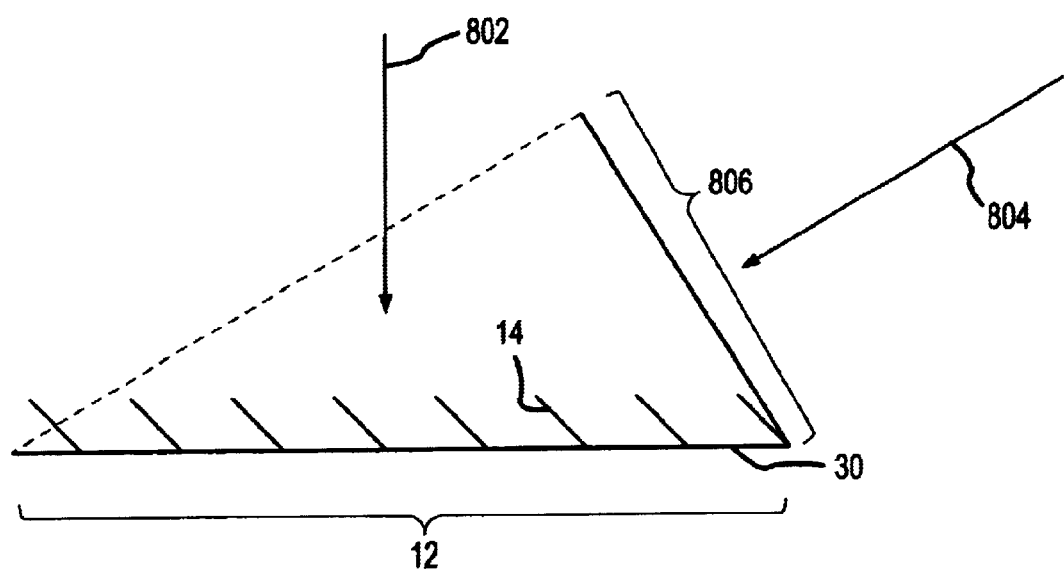
FIG. 8 illustrates the enhanced effective packing density achieved by an off axis reflective microstructure array in accordance with the present invention.

Referring now to FIG. 8, an off axis reflective microstructure array 12, and hence OXCs and the like incorporating an off axis reflective microstructure array 12, enable an effective packing density and effective fill factor that are greater than the real packing density and real fill factor of the reflective microstructure array 12. In this regard, packing density refers to how many reflective microstructures 14 are be packed into a given area of the supporting substrate 30 on which they are formed. Packing density is subtlety different from fill factor, which refers to the fraction of substrate 30 that is covered by reflective surfaces 20. High packing density and fill factor are desirable for OXC applications and the like because, for a given range of reflective microstructure 14 tilt angles, the higher the packing density and fill factor the larger the number of originating and target locations 16, 18 that one can address. Or equivalently, for a given number of reflective microstructures 14 and reflective microstructure 14 tilt angle range, one can reduce the optical path length (and hence optical signal loss) if the array has high packing density and fill factor.

For optical signals 24 that impinge on the reflective microstructure array 12 from a direction (represented by arrow 802) that is substantially parallel to the substrate normal 34, the packing density and fill factor are the "real" ones. However, where optical signals 24 impinge on the reflective microstructure array 12 from a direction (represented by arrow 804) that is substantially non-parallel to the substrate normal 34 as permitted by an off axis reflective microstructure array 14, a greater fraction of the "effective" area 806 of the reflective microstructure array 14 is covered by reflective surfaces 20. Thus, the "effective" fill factor is greater than the real fill factor. Furthermore, the "effective" lateral spacing of the reflective microstructures 14 is reduced in the direction of the incident optical signals 24, making the "effective" packing density greater. If the angles are such that the optical signals 24 travel in the direction of arrow 804, the effective packing density and fill factor in the direction shown is maximized, and the fill factor and packing density can approach 100% depending on the shape of the reflective surfaces 20.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A system for redirecting optical signals, said system comprising:
   at least one substrate having a first surface;
   at least one reflective microstructure array formed on said substrate, said reflective microstructure array including at least one reflective microstructure, each said reflective microstructure of said reflective microstructure array including an optically reflective surface and being positionable with respect to the first surface of said substrate in at least one orientation wherein the reflective surface thereof is positioned to redirect an optical signal from at least one originating location to at least one target location, each said orientation of each said reflective microstructure being defined by an associated unit normal vector orthogonal to the reflective surface thereof;

a set of unit normal vectors comprising substantially all of the unit normal vectors associated with each said orientation of each said reflective microstructure wherein the reflective surface thereof is positioned to redirect an optical signal from at least one originating location to at least one target location, the set of unit normal vectors including at least two unit normal vectors that are non-parallel; and an average normal vector associated with said reflective microstructure array, said average normal vector comprising the average of the unit normal vectors in said set of unit normal vectors;

wherein said average normal vector associated with said reflective microstructure array forms an acute angle with a vector normal to the first surface of said substrate, said angle being greater than five degrees.

2. The system of claim 1 wherein said angle is greater than ten degrees and less than eighty degrees.

3. The system of claim 1 wherein each said reflective microstructure of said reflective microstructure array is positionable to selectively switch an optical signal on and off at a target location.

4. The system of claim 1 wherein each said originating location and each said target location comprise an optical port, said reflective microstructures of said reflective microstructure array being positionable in orientations required to redirect optical signals between selected optical ports.

5. The system of claim 4 wherein at least a portion of said optical ports are arranged in at least one array of optical ports, said optical ports within said array of optical ports being arranged in a first plane.

6. The system of claim 4 wherein said system includes at least two reflective microstructure arrays, and wherein said reflective microstructures of said reflective microstructure arrays are positionable to redirect optical signals between selected groups of optical ports associated with respective reflective microstructure arrays.

7. The system of claim 1 wherein said system comprises an optical protection switch.

8. The system of claim 1 wherein said system comprises an optical signal multiplexer.

9. The system of claim 1 wherein said system comprises an optical signal demultiplexer.

10. The system of claim 1 wherein said target location comprises at least one of an optical port, a positionable reflective microstructure, an optical sensor, a fluorescent screen, a polarizer, a diffraction grating, a portion of a person's anatomy, a target cell in an aqueous solution, a prism, and an optical signal attenuator.

11. The system of claim 1 further comprising:

a fixed reflective surface that is fixed in a position relative to the reflective microstructure array to provide an optical pathway between the target location and the reflective microstructure array.

12. The system of claim 1 wherein said system includes at least two reflective microstructure arrays and said system further comprises:

a fixed reflective surface fixed relative to said reflective microstructure arrays, said fixed reflective surface being positioned to provide an optical pathway between said reflective microstructure arrays.

13. The system of claim 1 wherein said system includes at least two substrates and at least two reflective microstructure arrays, each reflective microstructure array being formed on a separate one of said substrates, at least two of said substrates being positioned such that vectors normal to the first surfaces thereof are parallel.

14. The system of claim 1 wherein said reflective microstructures of said at least one reflective microstructure array are arranged in a rectangular pattern of rows and columns.

15. The system of claim 1 wherein the vector normal to the first surface of said substrate is parallel with at least one of an optical signal beam incident on said reflective microstructure and the optical signal beam reflected from said reflective microstructure.

16. The system of claim 1 wherein an effective packing density of said reflective microstructure array exceeds a real packing density of said reflective microstructure array.

17. The system of claim 1 wherein each said reflective microstructure of said reflective microstructure array is positionable with at least one degree of freedom.

18. The system of claim 1 wherein each said reflective microstructure of said reflective microstructure array is positionable with two degrees of freedom.

19. The system of claim 1 wherein each said reflective microstructure of said reflective microstructure array is positionable with open loop control.

20. The system of claim 1 wherein said optically reflective surface of each said reflective microstructure of said reflective microstructure array comprises an optically reflective coating.

21. The system of claim 1 wherein said reflective microstructure array includes at least one microactuator formed on said substrate for each said reflective microstructure of said array, each said reflective microstructure being operatively coupled with at least one of said microactuators.

22. The system of claim 21 wherein said at least one microactuator comprises at least one of an electrostatic actuator, an electromagnetic actuator, a thermal actuator, and a magnetic actuator.

23. The system of claim 1 wherein at least a portion of said reflective microstructure array is formed on said substrate using at least one of sacrificial surface micromachining, bulk micromachining, and LIGA.

24. A system for redirecting optical signals, said system comprising:

at least one substrate having a first surface;

at least one reflective microstructure array formed on said substrate, said reflective microstructure array including at least one reflective microstructure, each said reflective microstructure of said reflective microstructure array including an optically reflective surface and being positionable with respect to the first surface of said substrate in at least one orientation wherein the reflective surface thereof is positioned to redirect an optical signal from at least one originating location to at least one target location, each said orientation of each said reflective microstructure being defined by an associated unit normal vector orthogonal to the reflective surface thereof;

a set of unit normal vectors comprising substantially all of the unit normal vectors associated with each said orientation of each said reflective microstructure wherein the reflective surface thereof is positioned to redirect an optical signal from at least one originating location to at least one target location, the set of unit normal vectors including at least two unit normal vectors that are non-parallel; and an average normal vector associated with said reflective microstructure array, said average normal vector comprising the average of the unit normal vectors in said set of unit normal vectors;

wherein said average normal vector associated with said reflective microstructure array forms a first angle with a vector normal to the first surface of said substrate, said first angle being greater than five degrees; and wherein, a set of second angles measured between projections of each unit normal vector in said set of unit normal vectors onto the first surface of said substrate and a reference axis defined on the first surface of said substrate span a range that is greater than two degrees.

25. The system of claim 24 wherein said first angle is greater than ten degrees.

26. The system of claim 24 wherein said range that is greater than ten degrees.

27. A system for redirecting optical signals, said system comprising:

at least one substrate having a first surface; and at least one reflective microstructure array formed on said substrate, said reflective microstructure array including at least one reflective microstructure, each said reflective microstructure of said reflective microstructure array including an optically reflective surface and being positionable with respect to the first surface of said substrate in at least one orientation wherein the reflective surface thereof is positioned to redirect an optical signal from at least one originating location to at least one target location, each said orientation of each said reflective microstructure being defined by an associated unit normal vector orthogonal to the reflective surface thereof; and a set of unit normal vectors comprising substantially all of the unit normal vectors associated with each said orientation of each said reflective microstructure wherein the reflective surface thereof is positioned to redirect an optical signal from at least one originating location to at least one target location, the set of unit normal vectors including at least two unit normal vectors that are non-parallel;

wherein, a set of angles measured between projections of each unit normal vector in said set of unit normal vectors onto the first surface of said substrate and a reference axis defined on the first surface of said substrate span a range that is greater than two degrees and less than one-hundred eighty degrees.

28. The system of claim 27 wherein said range is greater than ten degrees and less than one-hundred twenty degrees.

29. An optical cross connect for switching optical signals between a first plurality of optical ports and a second plurality of optical ports, said optical cross connect comprising:

a first substrate having a surface facing the first plurality of optical ports;

a second substrate having a surface facing the second plurality of optical ports, wherein said first and second pluralities of optical ports are positioned on a first side of a free space switch interface and said first and second substrates are positioned on a second side of the free space switch interface opposite the first side of the free space switch interface;

a first off axis reflective microstructure array formed on the surface of said first substrate, wherein said first off axis reflective microstructure array includes a plurality of reflective microstructures, each said reflective microstructure of said first off axis reflective microstructure array being associated with one of said first plurality of optical ports and including an optically reflective surface; and a second off axis reflective microstructure array formed on the surface of said second substrate, wherein said second off axis reflective microstructure array includes a plurality of reflective microstructures, each said reflective microstructure of said second off axis reflective microstructure array being associated with one of said second plurality of optical ports and including an optically reflective surface;

each said reflective microstructure of said first off axis reflective microstructure array being positionable to orient its reflective surface to reflect an optical signal receivable from its associated optical port to the reflective surface of at least one reflective microstructure of said second off axis reflective microstructure array and positionable to orient its reflective surface to reflect an optical signal receivable from at least one reflective microstructure of said second off axis reflective microstructure array to its associated optical port;

each said reflective microstructure of said second off axis reflective microstructure array being positionable to orient its reflective surface to reflect an optical signal receivable from its associated optical port to the reflective surface of at least one reflective microstructure of said first off axis reflective microstructure array and positionable to orient its reflective surface to reflect an optical signal receivable from at least one reflective microstructure of said first off axis reflective microstructure array to its associated optical port.

30. The optical cross connect of claim 29 wherein said first and second pluralities of optical ports are laterally spaced apart from one another on the first side of the free space switch interface and wherein said first and second substrates are laterally spaced apart from one another on the second side of the free space switch interface.

31. The optical cross connect of claim 30 further comprising:

a reflective surface positioned on the first side of the free space switch interface between said first and second pluralities of optical ports.

32. The optical cross connect of claim 31 wherein said first and second pluralities of optical ports are arranged in rows and columns and said reflective microstructures of said first and second off axis reflective microstructure arrays are arranged in corresponding rows and columns on said first and second substrates.

33. The optical cross connect of claim 32 wherein a minimum pitch S of said reflective microstructures along said rows is specified by the following equation:

$$S \geq D \frac{\cos\theta}{\cos 2\theta}$$

wherein D is the dimension of said reflective microstructures measured in the direction of said rows and $\theta$ is the tilt angle of each said off axis reflective microstructure with respect to said first and second substrates, respectively, about an axis orthogonal to the direction of said rows.

34. The optical cross connect of claim 33 wherein a minimum distance H measured from the first side to the second side of the free space switch interface is specified by the following equation:

$$H \geq 0.75 \frac{mD}{\sin\theta}$$

wherein m is the number of said reflective microstructures in said rows.

35. The optical cross connect of claim 34 wherein a maximum pitch S' of said reflective microstructures along said columns is specified by the following equation:

$$S' \leq \frac{m}{n} S \tan(\alpha)$$

wherein n is the number of said reflective microstructures in said columns and α is the tilt angle of each said reflective microstructure with respect to said first and second substrates, respectively, about an axis orthogonal to the direction of said columns.

36. A method of redirecting optical signals from originating locations to target locations, said method comprising the steps of:
positioning each reflective microstructure of a reflective microstructure array fabricated on a first surface of a substrate in an appropriate orientation with respect to the first surface of the substrate for receiving an optical signal from a specified originating location and reflecting the optical signal to a specified target location, the orientation of each reflective microstructure being defined by an associated unit normal vector that is oriented orthogonal to a reflective surface of each reflective microstructure;
receiving optical signals on the reflective surfaces of the reflective microstructures from the specified originating locations for which the reflective microstructures are appropriately oriented; and
reflecting the optical signals received on the reflective surfaces of the reflective microstructures to the specified target locations for which the reflective microstructures are appropriately oriented;
wherein, in said positioning step, there are at least two non-parallel unit normal vectors associated with the orientations of the reflective microstructures wherein the reflective surfaces thereof are oriented for receiving an optical signal from a specified originating location and reflecting the optical signal to a specified target location; and
wherein, in said positioning step, an average normal vector comprising substantially all of the unit normal vectors associated with the orientations of the reflective microstructures forms an acute angle with a vector normal to the first surface of the substrate, said angle being greater than five degrees.

37. The method of claim 36 wherein in said step of positioning each reflective microstructure, at least one of the specified target locations comprises a fixed reflective surface fixed relative to the reflective microstructure array.

38. The method of claim 36 wherein in said step of positioning each reflective microstructure, at least one of the specified originating locations comprises a fixed reflective surface fixed relative to the reflective microstructure array.

39. The method of claim 36 wherein in said step of positioning each reflective microstructure, at least one of the specified originating locations comprises an optical port.

40. The method of claim 36 wherein in said step of positioning each reflective microstructure, at least one of the specified target locations comprises an optical port.

41. The method of claim 36 wherein said angle is greater than ten degrees and less than eighty degrees.

42. An optical system, comprising:
a plurality of first optical ports operative for at least one of transmitting and receiving optical beams;
a plurality of second optical ports operative for at least one of transmitting and receiving optical beams; and
an array of first reflective devices formed on a substrate, each one of said first reflective devices being associated with one of said first optical ports and being movable across a range of angular orientations, each such orientation being defined by an axis normal to a reflective surface of said one of said first reflective devices, to optically connect said associated one of said first ports with substantially any one of said second ports, said range of angular orientations for any one of said first reflective devices being defined by a center axis having a directional orientation associated with a unit vector such that a first device set including substantially all of said first reflective devices of said array of first reflective devices defines a first center axis set including all of the center axes of said first reflective devices of said first device set and a corresponding first unit vector set including the unit vectors associated with the center axes of said first reflective devices;
said first optical ports, second optical ports and array of first reflective devices being configured such that an average orientation of said first center axis set, said average orientation of said first center axis set being the orientation of an average unit vector obtained by taking a vector sum of said unit vectors of said first unit vector set and dividing said sum by a number of said unit vectors of said first unit vector set, is angularly offset by at least five degrees and less than ninety degrees relative to an axis normal to said substrate on which said array of first reflective devices is formed, said axis normal to said substrate on which said array of first reflective devices is formed being parallel with optical beams transmitted form said plurality of first optical ports.

43. The system of claim 42 wherein said first optical ports, second optical ports and array of first reflective devices are configured such that the average orientation of said first center axis set is angularly offset by at least ten degrees and less than eighty degrees relative to the axis normal to said substrate on which said array of first reflective devices is formed.

44. The system of claim 42 further comprising:
an array of second reflective devices formed on a substrate, each one of said second reflective devices being associated with one of said second optical ports and being movable across a range of angular orientations, each such orientation being defined by an axis normal to a reflective surface of said one of said second reflective devices, to optically connect said associated one of said second ports with substantially any one of said first ports, said range of angular orientations for any one of said second reflective devices being defined by a center axis having a directional orientation associated with a unit vector such that a second device set including substantially all of said second reflective devices of said array of second reflective devices defines a second center axis set including all of the center axes of said second reflective devices of said second device set and a corresponding second unit vector set including the unit vectors associated with the center axes of said second reflective devices;

said first optical ports, second optical ports, array of first reflective devices, and array of second reflective devices being configured such that an average orientation of said second center axis set, said average orientation of said second center axis set being the orientation of an average unit vector obtained by taking a vector sum of said unit vectors of said second unit vector set and dividing said sum by a number of said unit vectors of said second unit vector set, is angularly offset by at least five degrees and less than ninety degrees relative to an axis normal to said substrate on which said array of second reflective devices is formed.

45. The system of claim 44 wherein said first optical ports, second optical ports, array of first reflective devices, and array of second reflective devices are configured such that the average orientation of said second center axis set is angularly offset by at least ten degrees and less than eighty degrees relative to the axis normal to said substrate on which said array of second reflective devices is formed.

46. The system of claim 44 wherein said substrate on which said array of first reflective devices is formed and said substrate on which said array of second reflective devices is formed comprise two separate substrates.

47. The system of claim 44 further comprising:
a fixed reflective surface fixed relative to said array of first reflective devices and said array of second reflective devices, said fixed reflective surface being positioned to provide an optical pathway between said array of first reflective devices and said array of second reflective devices.

48. The system of claim 44 wherein said axis normal to said substrate on which said array of second reflective devices is formed is parallel with optical beams transmitted from said plurality of second optical ports.

49. A system for redirecting optical signals, said system comprising:
at least one substrate having a first surface;
at least one reflective microstructure array formed on said substrate, said reflective microstructure array including at least one reflective microstructure, each said reflective microstructure of said reflective microstructure array including an optically reflective surface and being positionable with respect to the first surface of said substrate in at least one orientation wherein the reflective surface thereof is positioned to redirect an optical signal from at least one originating location to at least one target location, each said orientation of each said reflective microstructure being defined by an associated unit normal vector orthogonal to the reflective surface thereof;
a fixed reflective surface that is fixed in a position relative to the reflective microstructure array to provide an optical pathway between the target location and the reflective microstructure array;
a set of unit normal vectors comprising substantially all of the unit normal vectors associated with each said orientation of each said reflective microstructure; and
an average normal vector associated with said reflective microstructure array, said average normal vector comprising the average of the unit normal vectors in said set of unit normal vectors;
wherein said average normal vector associated with said reflective microstructure array forms an acute angle with a vector normal to the first surface of said substrate, said angle being greater than five degrees.

50. A system for redirecting optical signals, said system comprising:
at least one substrate having a first surface;
at least two reflective microstructure arrays formed on said substrate, each said reflective microstructure array including at least one reflective microstructure, each said reflective microstructure of each said reflective microstructure array including an optically reflective surface and being positionable with respect to the first surface of said substrate in at least one orientation wherein the reflective surface thereof is positioned to redirect an optical signal from at least one originating location to at least one target location, each said orientation of each said reflective microstructure being defined by an associated unit normal vector orthogonal to the reflective surface thereof;
a fixed reflective surface fixed relative to said reflective microstructure arrays, said fixed reflective surface being positioned to provide an optical pathway between said reflective microstructure arrays;
a set of unit normal vectors comprising substantially all of the unit normal vectors associated with each said orientation of each said reflective microstructure; and
an average normal vector associated with said reflective microstructure array, said average normal vector comprising the average of the unit normal vectors in said set of unit normal vectors;
wherein said average normal vector associated with said reflective microstructure array forms an acute angle with a vector normal to the first surface of said substrate, said angle being greater than five degrees.

51. A system for redirecting optical signals, said system comprising:
at least one substrate having a first surface;
at least one reflective microstructure array formed on said substrate, said reflective microstructure array including at least one reflective microstructure, each said reflective microstructure of said reflective microstructure array including an optically reflective surface and being positionable with respect to the first surface of said substrate in at least one orientation wherein the reflective surface thereof is positioned to redirect an optical signal from at least one originating location to at least one target location, each said orientation of each said reflective microstructure being defined by an associated unit normal vector orthogonal to the reflective surface thereof;
a set of unit normal vectors comprising substantially all of the unit normal vectors associated with each said orientation of each said reflective microstructure; and
an average normal vector associated with said reflective microstructure array, said average normal vector comprising the average of the unit normal vectors in said set of unit normal vectors;
wherein said average normal vector associated with said reflective microstructure array forms an acute angle with a vector normal to the first surface of said substrate, said angle being greater than five degrees; and
wherein an effective packing density of said reflective microstructure array exceeds a real packing density of said reflective microstructure array.

52. A system for redirecting optical signals, said system comprising:
at least one substrate having a first surface;
at least one reflective microstructure array formed on said substrate, said reflective microstructure array including at least one reflective microstructure, each said reflective microstructure of said reflective microstructure array including an optically reflective surface and being positionable with respect to the first surface of said substrate in at least one orientation wherein the reflective surface thereof is positioned to redirect an optical signal from at least one originating location to at least one target location, each said reflective microstructure being positionable with at least two degrees of freedom, each said orientation of each said reflective microstructure being defined by an associated unit normal vector orthogonal to the reflective surface thereof;

a set of unit normal vectors comprising substantially all of the unit normal vectors associated with each said orientation of each said reflective microstructure; and an average normal vector associated with said reflective microstructure array, said average normal vector comprising the average of the unit normal vectors in said set of unit normal vectors;

wherein said average normal vector associated with said reflective microstructure array forms an acute angle with a vector normal to the first surface of said substrate, said angle being greater than five degrees.

53. A method of redirecting optical signals from originating locations to target locations, said method comprising the steps of:

positioning each reflective microstructure of a reflective microstructure array fabricated on a first surface of a substrate in an appropriate orientation with respect to the first surface of the substrate for receiving an optical signal from a specified originating location and reflecting the optical signal to a specified target location, at least one of the specified target locations comprising a fixed reflective surface fixed relative to the reflective microstructure array, the orientation of each reflective microstructure being defined by an associated unit normal vector that is oriented orthogonal to a reflective surface of each reflective microstructure;

receiving optical signals on the reflective surfaces of the reflective microstructures from the specified originating locations for which the reflective microstructures are appropriately oriented; and reflecting the optical signals received on the reflective surfaces of the reflective microstructures to the specified target locations for which the reflective microstructures are appropriately oriented;

wherein, in said positioning step, an average normal vector comprising substantially all of the unit normal vectors associated with the orientations of the reflective microstructures forms an acute angle with a vector normal to the first surface of the substrate, said angle being greater than five degrees.

54. A method of redirecting optical signals from originating locations to target locations, said method comprising the steps of:

positioning each reflective microstructure of a reflective microstructure array fabricated on a first surface of a substrate in an appropriate orientation with respect to the first surface of the substrate for receiving an optical signal from a specified originating location and reflecting the optical signal to a specified target location, at least one of the specified originating locations comprising a fixed reflective surface fixed relative to the reflective microstructure array, the orientation of each reflective microstructure being defined by an associated unit normal vector that is oriented orthogonal to a reflective surface of each reflective microstructure;

receiving optical signals on the reflective surfaces of the reflective microstructures from the specified originating locations for which the reflective microstructures are appropriately oriented; and reflecting the optical signals received on the reflective surfaces of the reflective microstructures to the specified target locations for which the reflective microstructures are appropriately oriented;

wherein, in said positioning step, an average normal vector comprising substantially all of the unit normal vectors associated with the orientations of the reflective microstructures forms an acute angle with a vector normal to the first surface of the substrate, said angle being greater than five degrees.

* * * * *

UNITED STATES PATENT AND TRADEMARK OFFICE
CERTIFICATE OF CORRECTION

PATENT NO. : 6,944,365 B2
DATED : September 13, 2005
INVENTOR(S) : Miller et al.

It is certified that error appears in the above-identified patent and that said Letters Patent is hereby corrected as shown below:

Column 1,
Line 18, delete "demulitplexers", and insert therefor -- demultiplexers --.

Column 4,
Line 43, delete "mulitplexer", and insert therefor -- multiplexer--;
Line 44, delete "demulitplexer", and insert therefor -- demultiplexer --.

Column 24,
Line 39, delete "form", and insert therefor -- from --.

Signed and Sealed this

Twenty-ninth Day of November, 2005

JON W. DUDAS
*Director of the United States Patent and Trademark Office*